US009010095B2

(12) United States Patent
Himoto et al.

(10) Patent No.: US 9,010,095 B2
(45) Date of Patent: Apr. 21, 2015

(54) EXHAUST TREATMENT UNIT AND METHOD OF ATTACHING AND DETACHING EXHAUST TREATMENT UNIT

(71) Applicant: Komatsu Ltd., Tokyo (JP)

(72) Inventors: Manabu Himoto, Kyotanabe (JP); Osamu Nishimura, Joyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/123,599

(22) PCT Filed: Nov. 19, 2012

(86) PCT No.: PCT/JP2012/079934
§ 371 (c)(1),
(2) Date: Dec. 3, 2013

(87) PCT Pub. No.: WO2014/061167
PCT Pub. Date: Apr. 24, 2014

(65) Prior Publication Data
US 2014/0305110 A1  Oct. 16, 2014

(30) Foreign Application Priority Data

Oct. 16, 2012  (JP) ................................ 2012-228776

(51) Int. Cl.
*F01N 3/00* (2006.01)
*F01N 3/10* (2006.01)
(Continued)

(52) U.S. Cl.
CPC ............ *F01N 13/18* (2013.01); *F01N 13/1822* (2013.01); *B60K 13/04* (2013.01); *F01N 3/28* (2013.01); *E02F 9/0833* (2013.01); *E02F 9/0866* (2013.01); *F01N 13/08* (2013.01)

(58) Field of Classification Search
CPC ........ E02F 9/0833; E02F 9/0866; F01N 3/28; F01N 13/08; F01N 13/18; F01N 13/1822; B60K 13/04
USPC ................... 60/297, 299, 301, 311, 322, 324; 29/428; 180/296
See application file for complete search history.

(56) References Cited

U.S. PATENT DOCUMENTS

2010/0186381 A1* 7/2010 Charles et al. .................. 60/282
2010/0186394 A1* 7/2010 Harrison et al. ................ 60/299
(Continued)

FOREIGN PATENT DOCUMENTS

JP  2000-264267 A  9/2000
JP  2012-2016 A  1/2012
(Continued)

OTHER PUBLICATIONS

International Search Report for PCT/JP2012/079934, issued on Jan. 22, 2013.

*Primary Examiner* — Audrey K Bradley
(74) *Attorney, Agent, or Firm* — Global IP Counselors, LLP

(57) ABSTRACT

An exhaust treatment unit includes an exhaust treatment device that treats exhaust gas from an engine of a work vehicle, a bracket including an attachment portion attachable to a hoisting hook, and a detachable component. The bracket supports the exhaust treatment device. The detachable component is attachable to and detachable from the attachment portion. When the unit is attached, the hoisting hook is attached to the attachment portion, the unit is hoisted using a hoisting tool including the hoisting hook, moved to an attachment position and installed in the work vehicle. The hoisting hook is then detached from the attachment portion and the detachable component is attached to the unit using the attachment portion. When the unit is detached, the detachable component is detached from the attachment portion, the hoisting hook is attached to the attachment portion, and the unit is hoisted and detached using the hoisting tool.

20 Claims, 16 Drawing Sheets

(51) Int. Cl.
*F01N 3/02* (2006.01)
*B60K 13/04* (2006.01)
*F01N 13/18* (2010.01)
*F01N 3/28* (2006.01)
*E02F 9/08* (2006.01)
*F01N 13/08* (2010.01)

(56) References Cited

U.S. PATENT DOCUMENTS

2010/0187383 A1\* 7/2010 Olsen et al. .................. 248/201
2011/0000199 A1\* 1/2011 Ezawa et al. .................. 60/311
2011/0005853 A1\* 1/2011 Kamiya ........................ 180/296
2012/0247861 A1 10/2012 Mizuno et al.
2013/0160428 A1\* 6/2013 Okuda et al. .................. 60/272
2013/0213726 A1\* 8/2013 Okada .......................... 180/309

FOREIGN PATENT DOCUMENTS

JP 2012-97413 A 5/2012
WO 2011/152306 A1 12/2011

\* cited by examiner

EXHAUST TREATMENT UNIT AND METHOD OF ATTACHING AND DETACHING EXHAUST TREATMENT UNIT

CROSS-REFERENCE TO RELATED APPLICATIONS

This application is a U.S. National stage application of International Application No. PCT/JP2012/079934, filed on Nov. 19, 2012. This U.S. National stage application claims priority under 35 U.S.C. §119(a) to Japanese Patent Application No. 2012-228776, filed in Japan on Oct. 16, 2012, the entire contents of which are hereby incorporated herein by reference.

BACKGROUND

1. Field of the Invention

The present invention relates to an exhaust treatment unit for treating exhaust gas from an engine of a work vehicle.

2. Background Information

Work vehicles such as a hydraulic excavator are equipped with an exhaust treatment device. The exhaust treatment device is connected to an engine via a connection pipe (hereinafter, the connection pipe which connects the engine and the exhaust treatment device is referred to as a first connection pipe) in order to treat the exhaust gas from the engine. The exhaust treatment device includes a diesel particulate filter device and a selective catalytic reduction device as shown in, for example, Japanese Laid-Open Patent Application Publication No. 2012-097413.

The diesel particulate filter device is connected to the first connection pipe and performs treatment of reducing particulates in the exhaust gas from the engine. The treated exhaust gas is transferred to the selective catalytic reduction device via a connection pipe (hereinafter, the connection pipe which connects the diesel particulate filter device and the selective catalytic reduction device is referred to as a second connection pipe). The selective catalytic reduction device reduces nitrogen oxide (NOx) contained in the exhaust gas which was treated by the diesel particulate filter. In some cases, the two exhaust treatment devices and the second connection pipe are disposed in a single unit in order to facilitate maintenance, and the unit is installed in a work vehicle. Such a unit is referred to as an exhaust treatment unit.

The diesel particulate filter device and the selective catalytic reduction device are replaced after having been used for a predetermined period of time. Accordingly, the exhaust treatment unit is detached from the work vehicle after the predetermined period of time elapses. Since the exhaust treatment unit is heavy, it is desirable to hoist and transport the exhaust treatment unit using a hoisting device such as a crane when detaching the exhaust treatment unit. For this purpose, it is preferable that the exhaust treatment unit is provided with holes through which the hoisting hooks of the hoisting device can pass.

Further, various accessory components may be attached to the exhaust treatment unit in addition to the diesel particulate filter device and the selective catalytic reduction device. It is desirable to secure a structure for attaching these accessory components.

Providing a hole by which the exhaust treatment unit is hung on the hoisting hook of the hoisting device and a structure for attaching accessory components separately in the exhaust treatment unit complicates the structure of the exhaust treatment unit.

It is an aim of the present invention to solve the problem described above which occurs by separately providing the hole through which the hoisting hook of the hoisting device is inserted and the structure for attaching the accessory components.

Solution to Problems

An exhaust treatment unit according to a first aspect of the present invention is an exhaust treatment unit for treating exhaust gas from an engine of a work vehicle and comprises an exhaust treatment device, a bracket, and a detachable component. The exhaust treatment device treats the exhaust gas. The bracket supports the exhaust treatment device. The bracket includes an attachment portion attachable to a hoisting hook. The detachable component can be attached to and detached from the attachment portion.

An exhaust treatment unit according to the second aspect of the present invention relates to the exhaust treatment unit according to the first aspect, and the exhaust treatment device has a cylindrical shape. The attachment portion is provided with a member which extends upward from the bracket. The attachment portion is provided at a higher position than a center axis of the exhaust treatment device.

An exhaust treatment unit according to the third aspect of the present invention relates to the exhaust treatment unit according to the second aspect, and the exhaust treatment device includes a first exhaust treatment device and a second exhaust treatment device. The attachment portion is provided at a position where a hoisting tool including a hoisting hook attached to the attachment position does not interfere with a connection pipe connecting the first exhaust treatment device and the second exhaust treatment device.

An exhaust treatment unit according to the fourth aspect of the present invention relates to the exhaust treatment unit according to the third aspect, and the first exhaust treatment device and the second exhaust treatment device are disposed in alignment such that the longitudinal directions of the first exhaust treatment device and the second exhaust treatment device belong to an identical direction. The connection pipe is disposed above the second exhaust treatment device adjacent to the second exhaust treatment device such that the longitudinal direction of the connection pipe is the identical direction as the longitudinal directions of the first exhaust treatment device and the second exhaust treatment device. The attachment portion is provided outside a space which is under the connection pipe.

An exhaust treatment unit according to the fifth aspect of the present invention relates to the exhaust treatment unit according to the fourth aspect, and the outer diameter of the connection pipe is smaller than the outer diameter of the second exhaust treatment device. The attachment portion is provided between the first exhaust treatment device and the second exhaust treatment device.

An exhaust treatment unit according to the sixth aspect of the present invention relates to the exhaust treatment unit according to any of the third to fifth aspects, and the bracket supports the first exhaust treatment device and the second exhaust treatment device such that the center axis of the first exhaust treatment device is above the center axis of the second exhaust treatment device. The attachment portion is provided at a higher position than the center axis of the first exhaust treatment device.

An exhaust treatment unit according to the seventh aspect of the present invention relates to the exhaust treatment unit according to any of the third to sixth aspects, and the attachment portion includes a first hole portion through which a hoisting hook can be inserted and a second hole portion through which a coupling component for coupling the detachable component with the attachment portion can be inserted.

An exhaust treatment unit according to the eighth aspect of the present invention relates to the exhaust treatment unit according to any of the third to seventh aspects, and the bracket includes a sub-bracket and a base bracket. The sub-bracket supports the first exhaust treatment device. The base bracket supports the second exhaust treatment device and the sub-bracket.

An exhaust treatment unit according to the ninth aspect of the present invention relates to the exhaust treatment unit according to the eighth aspect, and the attachment portion includes a first attachment portion and a second attachment portion. The sub-bracket includes the first attachment portion. The base bracket includes the second attachment portion.

An exhaust treatment unit according to the tenth aspect of the present invention relates to the exhaust treatment unit according to the ninth aspect, and at least one of the attachment portions of the first attachment portion and the second attachment portion includes the first hole portion and the second hole portion. The hoisting hook can be inserted through the first hole portion. The coupling component for coupling the detachable component with at least one of the attachment portions can be inserted through the second hole portion.

An exhaust treatment unit according to the eleventh aspect of the present invention relates to the exhaust treatment unit according to any of the first to tenth aspects, and the detachable component is a cover covering at least a portion of the exhaust treatment unit.

An exhaust treatment unit according to the twelfth aspect of the present invention relates to the exhaust treatment unit according to any of the third to tenth aspects, and the detachable component is a support component of the connection pipe connecting the first exhaust treatment device and the second exhaust treatment device.

An exhaust treatment unit according to the thirteenth aspect of the present invention relates to the exhaust treatment unit according to the seventh or tenth aspect, and the first hole portion is larger than the second hole portion.

A method of attaching an exhaust treatment unit according to the fourteenth aspect of the present invention is a method of attaching an exhaust treatment unit for treating exhaust gas from an engine of a work vehicle, including attaching a hoisting hook to an attachment portion included in the exhaust treatment unit in a state where a detachable component of the work vehicle is detached; hoisting the exhaust treatment unit using a hoisting tool including a hoisting hook in a state where the detachable component is detached, moving the exhaust treatment unit up to an attachment position in the work vehicle, and installing the exhaust treatment unit in the work vehicle; detaching the hoisting hook from the attachment portion; and attaching the detachable component to the exhaust treatment unit using the attachment portion.

A method of detaching an exhaust treatment unit according to the fifteenth aspect of the present invention is a method of detaching an exhaust treatment unit for treating exhaust gas from an engine of a work vehicle, including detaching a detachable component of the work vehicle from an attachment portion included in the exhaust treatment unit; attaching a hoisting hook to the attachment portion in a state where the detachable component is detached; and hoisting the exhaust treatment unit using a hoisting tool including the hoisting hook in a state where the detachable component is detached, and detaching the exhaust treatment unit from the work vehicle.

Advantageous Effects of Invention

In the exhaust gas treatment unit according to the first aspect of the present invention, the bracket includes an attachment portion. Then, it is possible for the detachable component to be attached to and detached from the attachment portion. Thus, the attachment portion is used in two purposes. One is that a hoisting hook is attached to the attached portion and the other is that a detachable component is attached to the attached portion. As such, it is possible to simplify the structure of the exhaust treatment unit and therefore the manufacturing costs are reduced.

In the exhaust gas treatment unit according to the second aspect of the present invention, the attachment portion is provided with a member extending upward from the bracket. Furthermore, the attachment portion is provided at a higher position than a center axis of the exhaust treatment device. As a result, the attachment portion is provided at a position to which the hoisting hook is easily attached. As a result, a work of attaching the hoisting hook to the attachment portion and a work of detaching the hoisting hook from the attachment portion are facilitated.

In the exhaust treatment unit according to the third aspect of the present invention, the attachment portion is provided at a position where the hoisting tool attached to the attachment portion does not interfere with the connection pipe connecting the first exhaust treatment device and the second exhaust treatment device. Accordingly, the work of attaching the hoisting hook to the attachment portion and the work of detaching the hoisting hook from the attachment portion are facilitated.

In the exhaust gas treatment unit according to the fourth aspect of the present invention, the attachment portion is provided outside a space which is under the connection pipe. As a result, the connection pipe does not interfere with the hoisting tool attached to the attachment portion. Accordingly, the work of attaching the hoisting hook to the attachment portion and the work of detaching the hoisting hook from the attachment portion are facilitated.

In the exhaust treatment unit according to the fifth aspect of the present invention, the attachment portion is provided between the first exhaust treatment device and the second exhaust treatment device. Furthermore, the connection pipe is disposed above the second exhaust treatment device in the same direction as the direction in which the second exhaust treatment device is disposed, and the outer diameter of the connection pipe is smaller than the outer diameter of the second exhaust treatment device. As a result, the connection pipe does not interfere with the hoisting tool attached to the attachment portion. Accordingly, the work of attaching the hoisting hook to the attachment portion and the work of detaching the hoisting hook from the attachment portion are facilitated.

In the exhaust treatment unit according to the sixth aspect of the present invention, the center axis of the first exhaust treatment device is above the center axis of the second exhaust treatment device. In addition, the attachment portion is provided at a higher position than the center axis of the first exhaust treatment device. Accordingly, the first exhaust treatment device and the second exhaust treatment device do not cover a space over the attachment portion. As a result, the work of attaching the hoisting hook to the attachment portion and the work of detaching the hoisting hook from the attachment portion are facilitated.

In the exhaust treatment unit according to the seventh aspect of the present invention, the attachment portion includes the first hole portion and the second hole portion. It is possible to insert the hoisting hook through the first hole portion. It is possible to insert the coupling component for coupling the detachable component with the attachment portion through the second hole portion. As such, it is possible to fit the size of the second hole portion to the size of the coupling component.

In the exhaust treatment unit according to the eighth aspect of the present invention, the bracket includes two support components of the sub-bracket and the base bracket. Then, the sub-bracket supports the first exhaust treatment device and the base bracket supports the second exhaust treatment device. Accordingly, the first exhaust treatment device and the second exhaust treatment device are disposed on different support components. As a result, even if the replacement frequency of the first exhaust treatment device is different from that of the second exhaust treatment device, it is possible to replace only the first exhaust treatment device by detaching the sub-bracket.

In the exhaust treatment unit according to the ninth aspect of the present invention, the attachment portion includes the first attachment portion and the second attachment portion. Then, the sub-bracket includes the first attachment portion. Accordingly, it is possible to attach or detach only the sub-bracket using the first attachment portion. Furthermore, the first attachment portion is used in two purposes. One is that the hoisting hook is attached to the first attachment portion and the other is that the detachable component is attached to the first attachment portion. As such, it is possible to simplify the structure of the exhaust treatment unit and therefore the manufacturing costs are reduced.

In the exhaust treatment unit according to the tenth aspect of the present invention, at least one of the first attachment portion and the second attachment portion includes the first hole portion and the second hole portion. Accordingly, it is possible to provide the second hole portion in at least one of the attachment portions according to the size of the coupling component attached to the first attachment portion and/or the second attachment portion.

In the exhaust treatment unit according to the eleventh aspect of the present invention, the detachable component is a cover covering at least a portion of the exhaust treatment unit. Due to this, at least a portion of the exhaust treatment unit is covered by the cover.

In the exhaust treatment unit according to the twelfth aspect of the present invention, the detachable component is the support component of the connection pipe connecting the first exhaust treatment device and the second exhaust treatment device. The position and posture of the connection pipe are stabilized by attaching the support component to the connection pipe.

In the exhaust treatment unit according to the thirteenth aspect of the present invention, the first hole portion is larger than the second hole portion. Accordingly, it is possible to provide the first hole portion corresponding to a large hoisting hook.

The method of attaching the exhaust treatment unit according to the fourteenth aspect of the present invention includes attaching the hoisting hook to the attachment portion and attaching the detachable component to the exhaust treatment unit using the attachment portion. As a result, the attachment portion is used in two purposes. One is that the hoisting hook is attached to the attachment portion and the other is that the detachable component is attached to the attachment portion. As such, it is possible to simplify the structure of the exhaust treatment unit and therefore the manufacturing costs are reduced.

The method of detaching the exhaust treatment unit according to the fifteenth aspect of the present invention includes detaching the detachable component from the attachment portion and attaching the hoisting hook to the attachment portion. As a result, the attachment portion is used in two purposes. One is that the hoisting hook is attached to the attachment portion and the other is that the detachable component is attached to the attachment portion. As such, it is possible to simplify the structure of the exhaust treatment unit and therefore the manufacturing costs are reduced.

DETAILED DESCRIPTION OF EMBODIMENT(S)

Figure 1:
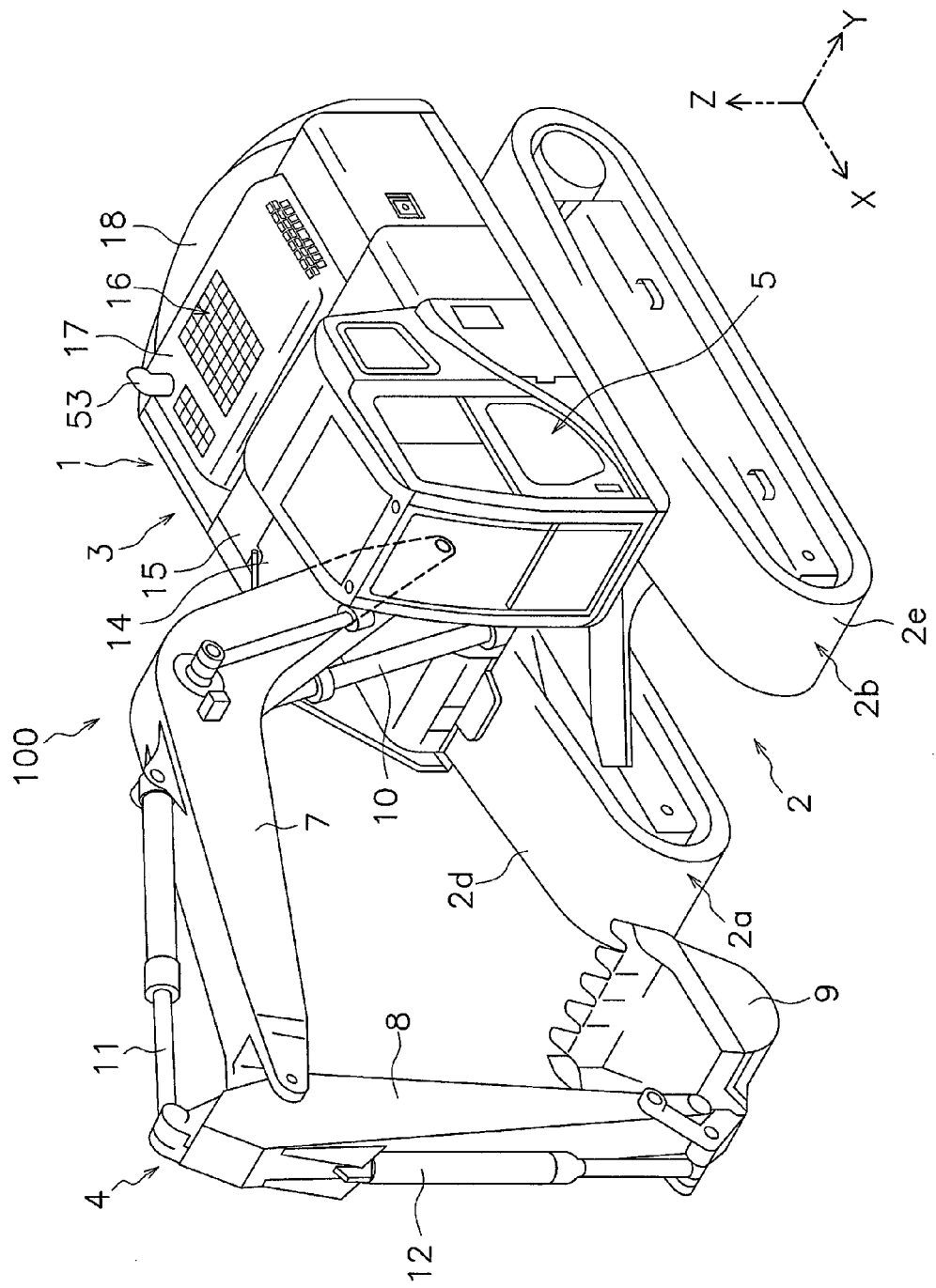
FIG. 1 is a perspective view of a work vehicle according to an exemplary embodiment of the present invention.

FIG. 1 illustrates a work vehicle 100 according to an exemplary embodiment of the present invention. In the present exemplary embodiment, explanation will be made by exemplifying a hydraulic excavator as the work vehicle. The work vehicle 100 includes a vehicle main body 1 and a working implement 4.

The vehicle main body 1 includes a travelling unit 2 and a revolving unit 3. The travelling unit 2 includes a pair of moving devices 2a and 2b. The drive units 2a and 2b respectively include crawler belts 2d and 2e. The drive units 2a and 2b are configured to drive the crawler belts 2d and 2e by means of driving force from an engine 21 to be described (refer to FIG. 2) for causing the work vehicle 100 to run. It should be noted that in the following explanation, the term back-and-forth direction" refers to the back-and-forth direction of the vehicle main body 1. In other words, the term "back-and-forth direction" refers to the back-and-forth direction seen from an operator seated in a cab 5. Further, the term "right-and-left direction" or the term "lateral direction" refers to the vehicle width direction of the vehicle main body 1. In other words, the right-and-left direction, the vehicle width direction, or the lateral direction is the right-and-left direction seen from the aforementioned operator. Further, in the drawings, the back-and-forth direction, the right-and-left direction and an up-and-down direction are represented with an x axis, a y axis, and a z axis, respectively.

The revolving unit 3 is mounted on the travelling unit 2. The revolving unit 3 is configured to be able to revolve with respect to the travelling unit 2. Further, the revolving unit 3 is provided with the cab 5. The revolving unit 3 includes a fuel tank 14, a hydraulic oil tank 15, an engine compartment 16, and a counterweight 18. The fuel tank 14 stores fuel for driving the engine 21 which will be described later. The fuel tank 14 is disposed in front of the hydraulic oil tank 15. The hydraulic oil tank 15 stores hydraulic oil to be discharged from a hydraulic pump 23 to be described hereinafter (see FIG. 2). The hydraulic oil tank 15 is disposed in alignment with the fuel tank 14 in the back-and-forth direction.

The engine compartment 16 accommodates a variety of devices such as the engine 21 and the hydraulic pump 23 which will be described later. The engine compartment 16 is disposed behind the cab 5, the fuel tank 14, and the hydraulic oil tank 15. The top side of the engine compartment 16 is covered with an engine hood 17. The counterweight 18 is disposed behind the engine compartment 16.

The working implement 4 is attached to the center position of a front part of the revolving unit 3. The working implement 4 includes a boom 7, an arm 8, a bucket 9, a boom cylinder 10, an arm cylinder 11, and a bucket cylinder 12. The base end of the boom 7 is rotatably coupled to the revolving unit 3. On the other hand, the tip end of the boom 7 is rotatably coupled to the base end of the arm 8. The tip end of the arm 8 is rotatably coupled to the bucket 9. The boom cylinder 10, the arm cylinder 11, and the bucket cylinder 12 are hydraulic cylinders configured to be driven by the hydraulic oil discharged from the hydraulic pump 23 which will be described later. The boom cylinder 10 is configured to actuate the boom 7. The arm cylinder 11 is configured to actuate the arm 8. The bucket cylinder 12 is configured to actuate the bucket 9. The working implement 4 is configured to be driven by the driving of the cylinders 10, 11 and 12.

Figure 2:
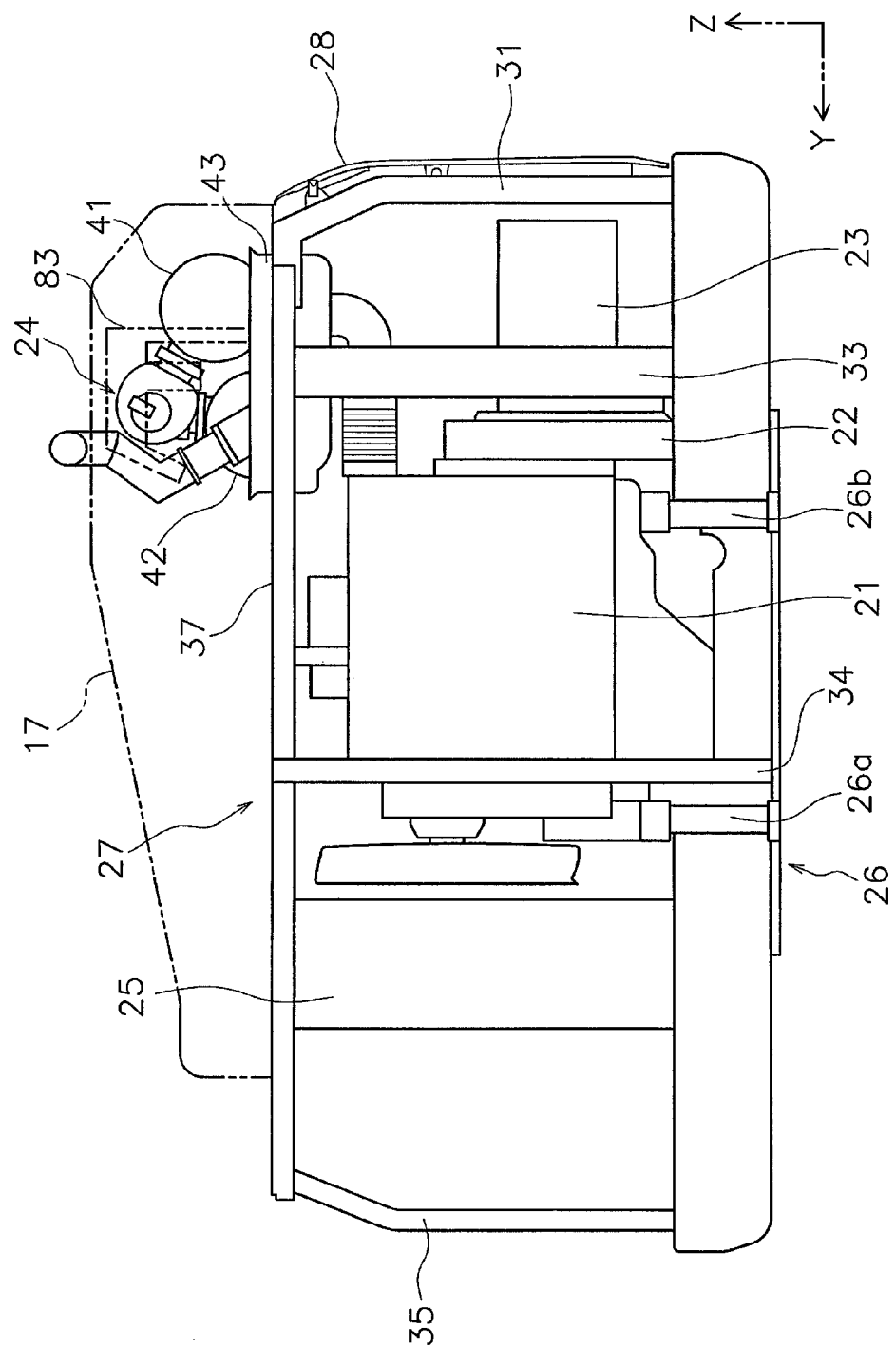
FIG. 2 is a diagram of an internal structure of an engine compartment seen from rear.
Figure 3:
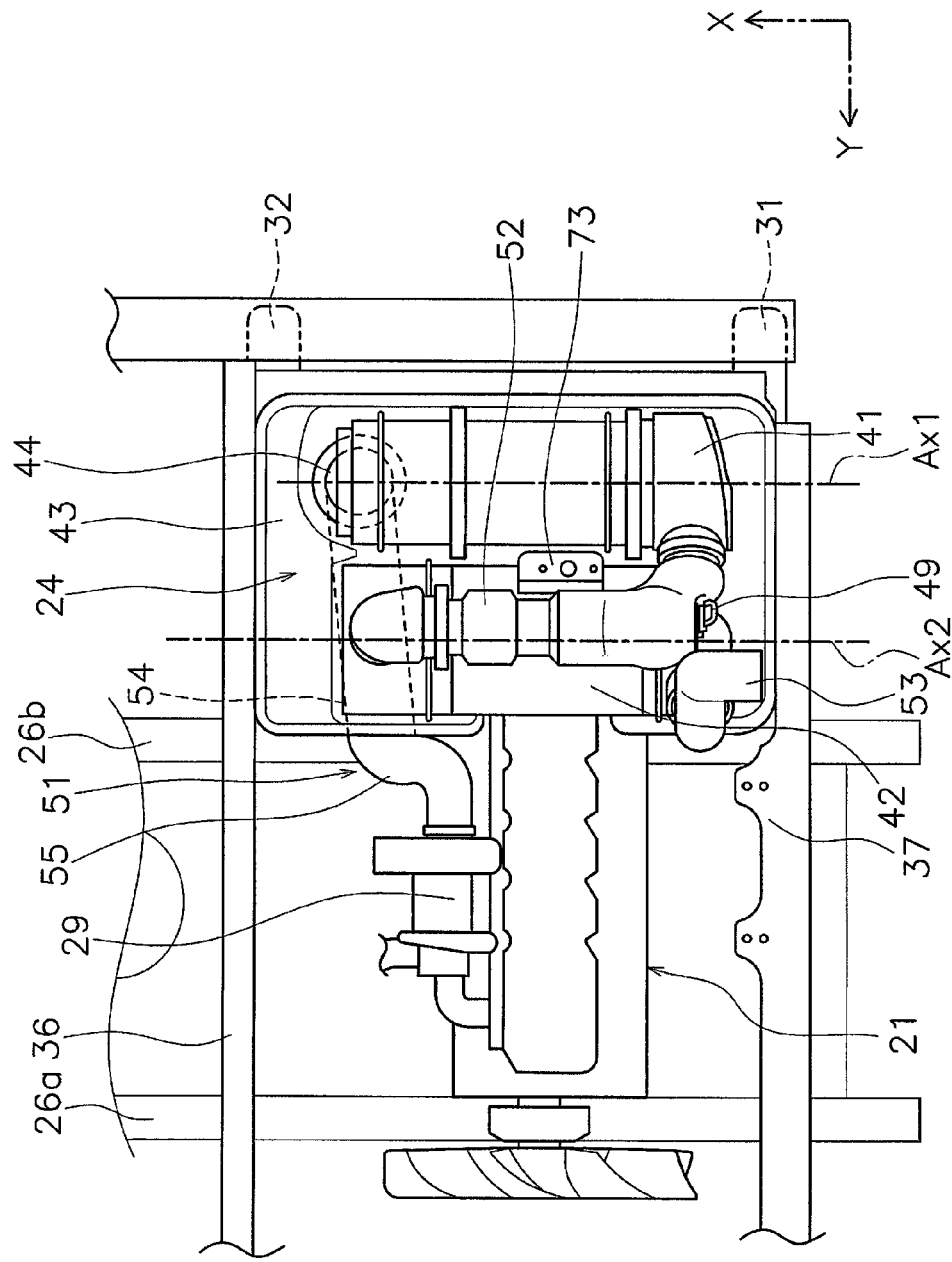
FIG. 3 is a diagram of an internal structure of the engine compartment seen from above.

FIG. 2 is a diagram of the internal structure of the engine compartment 16 seen from rear. FIG. 3 is a diagram of the internal structure of the engine compartment 16 seen from above. In FIG. 2, the engine hood 17 and a cover 83 which will be described later are depicted with two-dot chain lines. In FIG. 3, the cover 83 is omitted from the diagram. As illustrated in FIG. 2, the engine 21, a flywheel housing 22, the hydraulic pump 23, and an exhaust treatment unit 24 are disposed in the engine compartment 16. Further, a cooling device 25 including a radiator or an oil cooler is disposed in the engine compartment 16. The cooling device 25, the engine 21, the flywheel housing 22, and the hydraulic pump 23 are disposed in alignment with each other in the vehicle width direction.

As illustrated in FIG. 2, the work vehicle 100 includes a revolving frame 26 and a vehicle body frame 27. The revolving frame 26 includes a pair of center frames 26a and 26b extending in the back-and-forth direction. The revolving frame 26 supports the engine 21 through rubber dampers.

The vehicle body frame 27 is disposed upright on the revolving frame 26. The vehicle body frame 27 is disposed in the surrounding of a variety of devices such as the engine 21 and the hydraulic pump 23. An exterior cover 28 is attached to the vehicle body frame 27. It should be noted that FIG. 2 illustrates only a portion of the exterior cover 28. The engine hood 17 illustrated in FIG. 1 is also attached to the vehicle body frame 27.

As illustrated in FIGS. 2 and 3, the vehicle body frame 27 includes a plurality of pillar members 31 to 35 and a plurality of beam members 36 and 37. The pillar members 31 to 35 are disposed so as to extend upward from the revolving frame 26. The beam members 36 and 37 are supported by the pillar members 31 to 35. Specifically, as illustrated in FIG. 3, the plurality of beam members 36 and 37 include a first beam member 36 and a second beam member 37. The first beam member 36 and the second beam member 37 are disposed away from each other in the front and back direction. The first beam member 36 is disposed in front of the engine 21. The second beam member 37 is disposed behind the engine 21.

The hydraulic pump 23 is configured to be driven by the engine 21. As illustrated in FIG. 2, the hydraulic pump 23 is disposed laterally to the engine 21. In other words, the hydraulic pump 23 is disposed in alignment with the engine 21 in the vehicle width direction. The hydraulic pump 23 is disposed at a lower position than the top surface of the engine 21.

The flywheel housing 22 is disposed between the engine 21 and the hydraulic pump 23. The flywheel housing 22 is attached to a lateral surface of the engine 21. Further, the hydraulic pump 23 is attached to a lateral surface of the flywheel housing 22.

Figure 4:
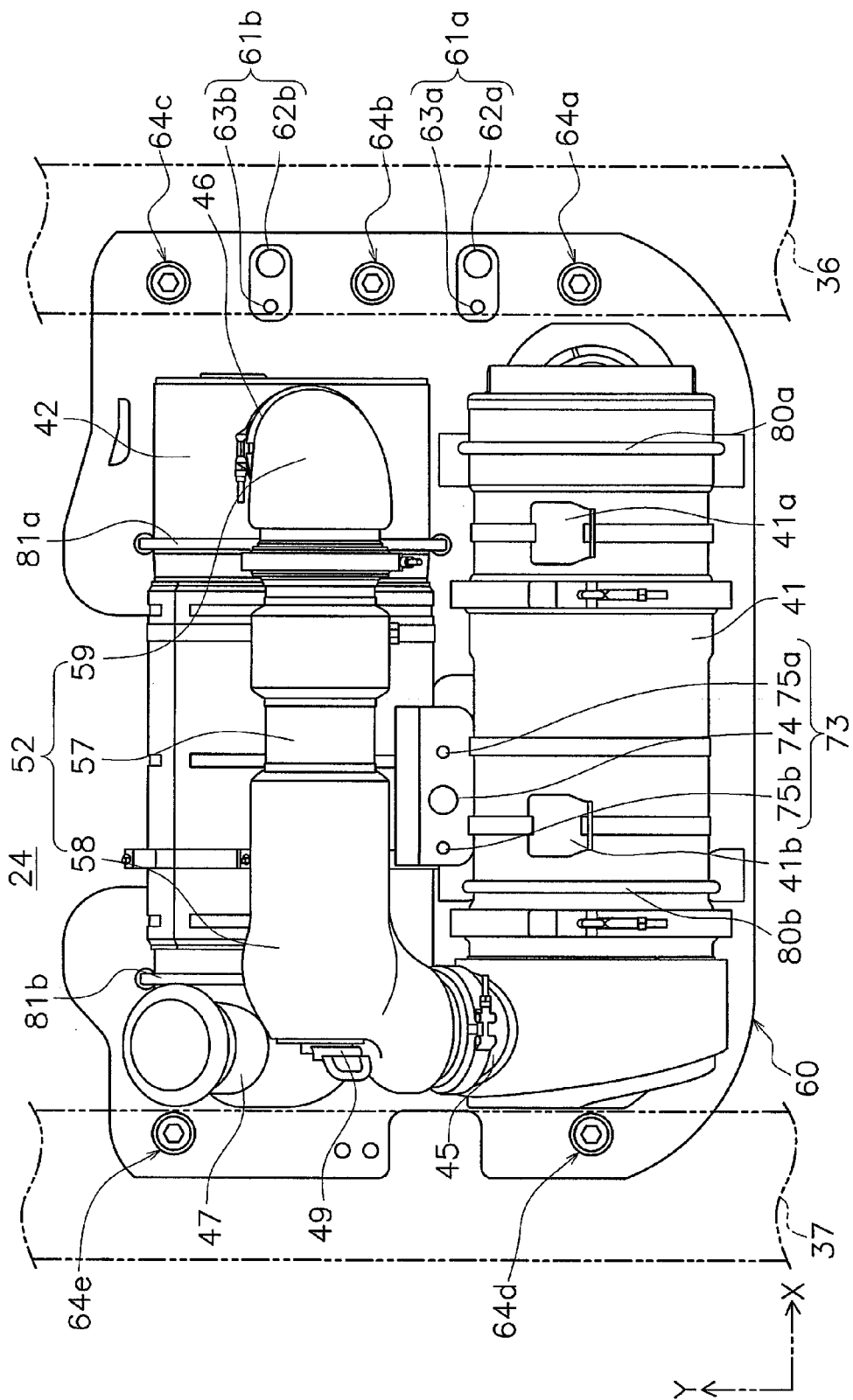
FIG. 4 is a plan view of an exhaust treatment unit.

As illustrated in FIG. 2, the exhaust treatment unit 24 is disposed above the hydraulic pump 23. FIG. 4 is an enlarged view of a part related to the exhaust treatment unit 24 in FIG. 3. In other words, FIG. 4 is a plan view of the exhaust treatment unit 24. In FIG. 4, some components, which are connected to the exhaust treatment unit 24 but not included in the exhaust treatment unit 24, are depicted with two-dot chain lines. As illustrated in FIGS. 3 and 4, the exhaust treatment unit 24 includes a first exhaust treatment device 41, a second exhaust treatment device 42, a bracket 43, and a second connection pipe 52. It should be noted that the first exhaust treatment device 41 and the second exhaust treatment device 42 are collectively simply referred to as the exhaust treatment device in the present exemplary embodiment. As illustrated in FIGS. 3 and 4, the exhaust treatment unit 24 is bridged between the first beam member 36 and the second beam member 37. The exhaust treatment unit 24 is supported by the beam members 36 and 37. In other words, the first exhaust treatment device 41 and the second exhaust treatment device 42 are supported by the vehicle body frame 27. As illustrated in FIGS. 2 to 4, the first exhaust treatment device 41 and the second exhaust treatment device 42 are disposed in alignment with each other in the vehicle width direction.

In the present exemplary embodiment, the first exhaust treatment device 41 is, for example, a diesel particulate filter device and is configured to treat the exhaust gas from the engine 21. The first exhaust treatment device 41 is configured to collect particulates contained in the exhaust gas by a filter. The first exhaust treatment device 41 is configured to burn the collected particulates by a heater attached to the filter.

The first exhaust treatment device 41 has a roughly cylindrical contour. As illustrated in FIG. 3, the first exhaust treatment device 41 is disposed such that its center axis Ax1 is arranged along the back-and-forth direction. Therefore, the first exhaust treatment device 41 is disposed such that its center axis Ax1 is arranged perpendicularly to a direction in which the engine 21 and the hydraulic pump 23 are aligned with each other (the direction will be hereinafter referred to as a first direction). In other words, the first exhaust treatment device 41 is disposed such that its longitudinal direction is arranged perpendicularly to the first direction. Furthermore, as illustrated in FIG. 4, the first exhaust treatment device 41 includes sixth attachment portions 41a and 41b. The sixth attachment portions 41a and 41b are components to which a hoisting hook such as a crane hoisting the first exhaust treatment device 41 is attached. The details of the sixth attachment portions 41a and 41b will be described later.

In the present exemplary embodiment, the second exhaust treatment device 42 is, for example, a selective catalytic reduction device and is configured to treat the exhaust gas from the engine 21. The second exhaust treatment device 42 is configured to selectively reduce nitrogen oxide NOx by urea hydrolysis. The second exhaust treatment device 42 has a roughly cylindrical contour. The second exhaust treatment device 42 is disposed such that its center axis Ax2 is arranged along the back-and-forth direction. Therefore, the second exhaust treatment device 42 is disposed such that its center axis Ax2 is arranged perpendicularly to the first direction. In other words, the second exhaust treatment device 42 is disposed such that its longitudinal direction is arranged perpendicularly to the first direction. Further, the second exhaust treatment device 42 is disposed such that its center axis Ax2 is arranged in parallel to the center axis Ax1 of the first exhaust treatment device 41. In other words, the first exhaust treatment device 41 and the second exhaust treatment device 42 are disposed in alignment with each other such that the longitudinal directions of the first exhaust treatment device 41 and the second exhaust treatment device 42 are the same.

Figure 5:
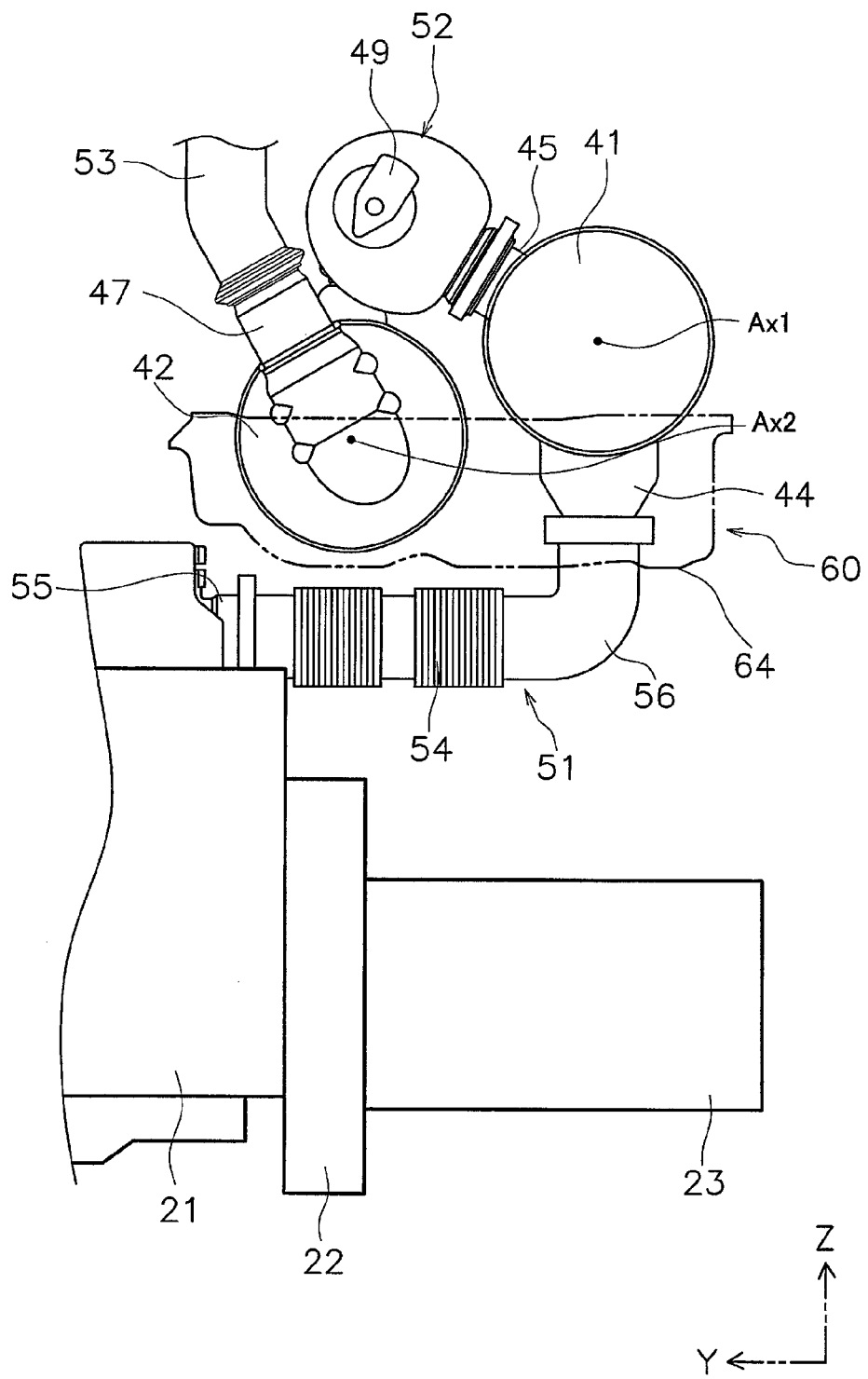
FIG. 5 is an enlarged view of the exhaust treatment unit and its vicinity of FIG. 2.
Figure 6:
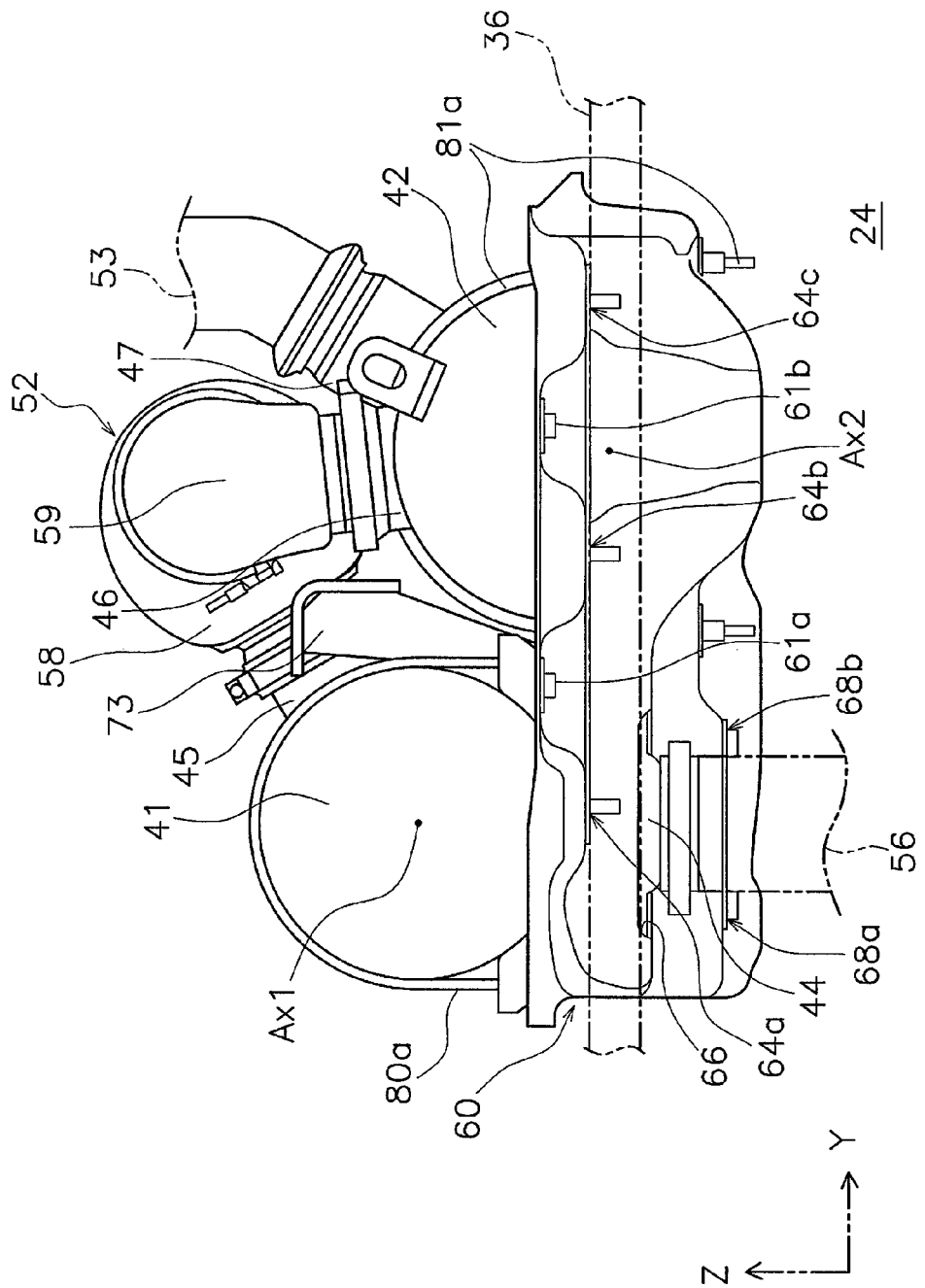
FIG. 6 is a diagram of the exhaust treatment unit seen from front.
Figure 7:
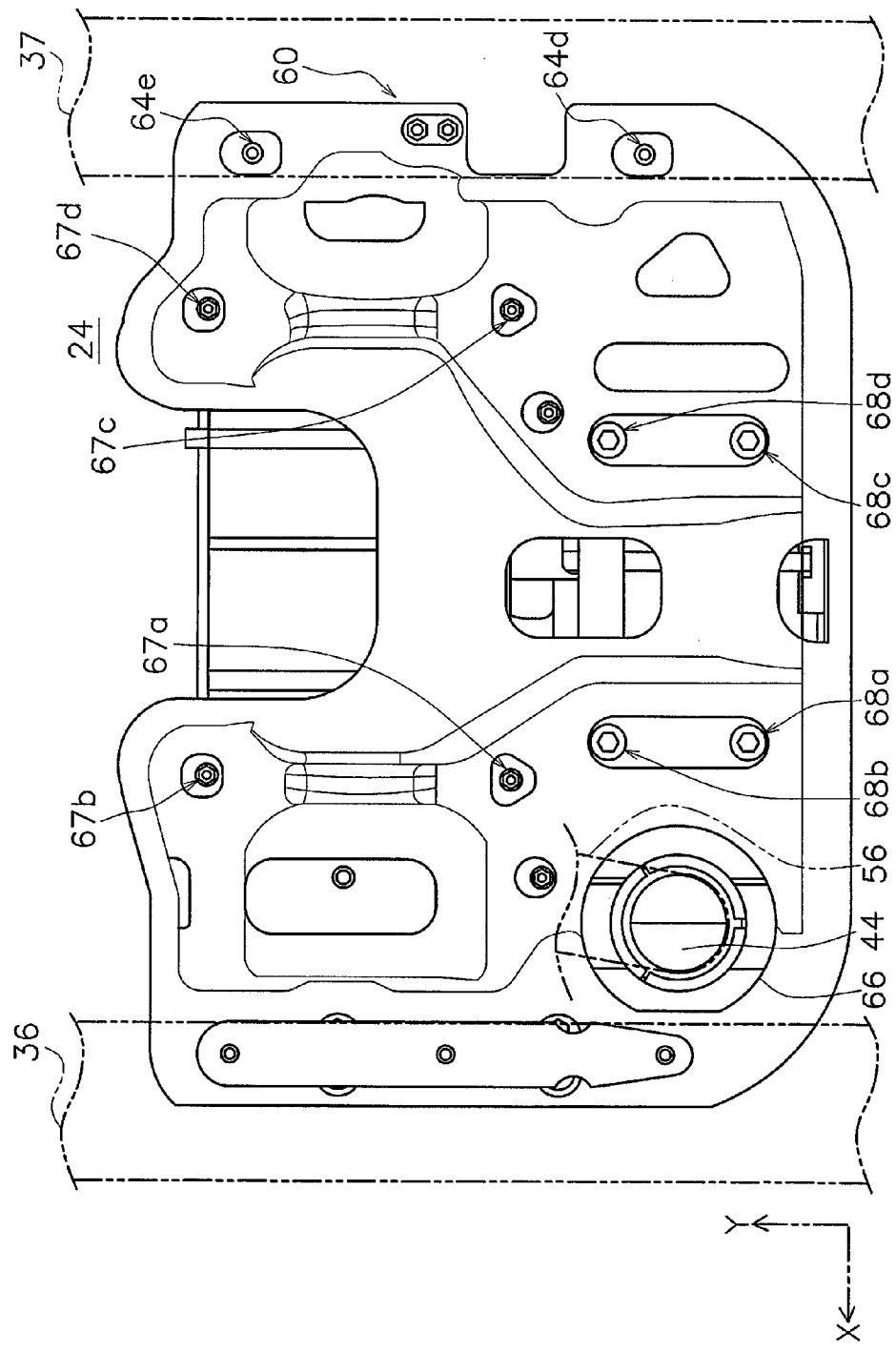
FIG. 7 is a bottom view of the exhaust treatment unit.

FIG. 5 is an enlarged view of the exhaust treatment unit and its vicinity of FIG. 2. It should be noted that in FIG. 5, for easy understanding, the contour of a base bracket 60 which will be described later is depicted with a two-dot chain line without illustration of some components such as the vehicle body frame 27. FIG. 6 is a diagram of the exhaust treatment unit 24 in FIG. 5 seen from the front. FIG. 7 is a bottom view of the exhaust treatment unit 24. In FIGS. 6 and 7, some components, which are connected to the exhaust processing unit 24 but not included in the exhaust treatment unit 24, the some components excluding a cover are displayed with dashed two-dotted lines.

As illustrated in FIG. 5, the first exhaust treatment device 41 and the second exhaust treatment device 42 are disposed above the hydraulic pump 23. The bottom part of the second exhaust treatment device 42 is positioned below the top surface of the engine 21. As illustrated in FIGS. 5 to 7, the first exhaust treatment device 41 includes a first connection port 44.

As illustrated in FIG. 5, the work vehicle 100 includes a first connection pipe 51. The first connection pipe 51 couples the engine 21 and the first exhaust treatment device 41. The first connection pipe 51 includes a bellows part 54 that can be extended and contracted. For example, the bellows part 54 is formed by coupling a plurality of bellows-type expansion and contraction joints. The bellows part 54 is horizontally disposed. Specifically, the bellows part 54 extends in the vehicle width direction. The bellows part 54 is disposed above the hydraulic pump 23. The bellows part 54 is partially positioned under the second exhaust treatment device 42. In other words, the first connection pipe 51 passes under the second exhaust treatment device 42.

The first connection pipe 51 includes a first curved portion 55 and a second curved portion 56. As illustrated in FIG. 3, the first curved portion 55 couples the bellows part 54 and the engine 21. In other words, one end of the first connection pipe 51 is connected to an exhaust port of the engine 21 via a supercharger 29. As illustrated in FIGS. 5 to 7, the second curved portion 56 couples the bellows part 54 and the first connection port 44. In other words, the other end of the first connection pipe 51 is connected to the first connection port 44 of the first exhaust treatment device 41.

As illustrated in FIGS. 5 and 7, the first connection port 44 is set on the lowermost part of the first exhaust treatment device 41. Therefore, the connection part between the first connection pipe 51 and the first exhaust treatment device 41 is positioned right below the first exhaust treatment device 41.

As illustrated in FIGS. 4 and 6, the first exhaust treatment device 41 includes a second connection port 45. The second connection port 45 protrudes obliquely upwards in the vehicle width direction. The second exhaust treatment device 42 includes a third connection port 46. The third connection port 46 is positioned on the uppermost part of the second exhaust treatment device 42.

The exhaust treatment unit 24 includes the second connection pipe 52. One end of the second connection pipe 52 is connected to the second connection port 45 of the first exhaust treatment device 41. The other end of the second connection pipe 52 is connected to the third connection port 46 of the second exhaust treatment device 42. In other words, the second connection pipe 52 connects the first exhaust treatment device 41 and the second exhaust treatment device 42. The second connection pipe 52 is disposed adjacently the second exhaust treatment device 42 while being disposed over the second exhaust treatment device 42.

As illustrated in FIG. 4, the second connection pipe 52 includes a straight portion 57, a third curved portion 58, and a fourth curved portion 59. The straight portion 57 is positioned over the second exhaust treatment device 42. The straight portion 57 extends in a direction parallel to the center axis Ax2 of the second exhaust treatment device 42. In other words, the second connection pipe 52 is disposed such that the longitudinal direction of the second connection pipe 52 is the same direction as the longitudinal directions of the first exhaust treatment device 41 and the second exhaust treatment device 42. The third curved portion 58 couples the straight portion 57 and the second connection port 45. The fourth curved portion 59 couples the straight portion 57 and the third connection port 46. An aqueous urea injection device 49 is attached to the third curved portion 58. The aqueous urea injection device 49 is configured to inject aqueous urea into the second connection pipe 52.

As illustrated in FIGS. 4 to 6, the outer diameter of the second connection pipe 52 is smaller than the outer diameter of the second exhaust treatment device 42. Furthermore, the second connection pipe 52 is disposed such that the longitudinal direction of the second connection pipe 52 is the same as the longitudinal directions of the first exhaust treatment device 41 and the second exhaust treatment device 42. As a result, the majority of the space between the first exhaust treatment device 41 and the second exhaust treatment device 42 is not positioned under the second connection pipe 52.

As illustrated in FIGS. 4 to 6, the second exhaust treatment device 42 includes a fourth connection port 47. The fourth connection port 47 protrudes obliquely upwards. Specifically, the fourth connection port 47 obliquely protrudes upwards and towards the engine 21. The aforementioned aqueous urea injection device 49 is positioned over the fourth connection port 47. However, the fourth connection port 47 is obliquely disposed to avoid interfering with the aqueous urea injection device 49. The work vehicle 100 is provided with an exhaust pipe 53. The exhaust pipe 53 is connected to the fourth connection port 47. The upper part of the exhaust pipe 53 protrudes upwardly from the engine hood 17.

The engine 21, the first connection pipe 51, the first exhaust treatment device 41, the second connection pipe 52, the second exhaust treatment device 42, and the exhaust pipe 53 are connected in series in this sequential order. Accordingly, the exhaust gas from the engine 21 is transferred to the first exhaust treatment device 41 via the first connection pipe 51. In the first exhaust treatment device 41, particulates are mostly reduced from the exhaust gas. Next, the exhaust gas is transferred to the second exhaust treatment device 42 via the second connection pipe 52. In the second exhaust treatment device 42, NOx is mostly reduced. Subsequently, the cleaned exhaust gas is discharged to the outside via the exhaust pipe 53.

Figure 8:
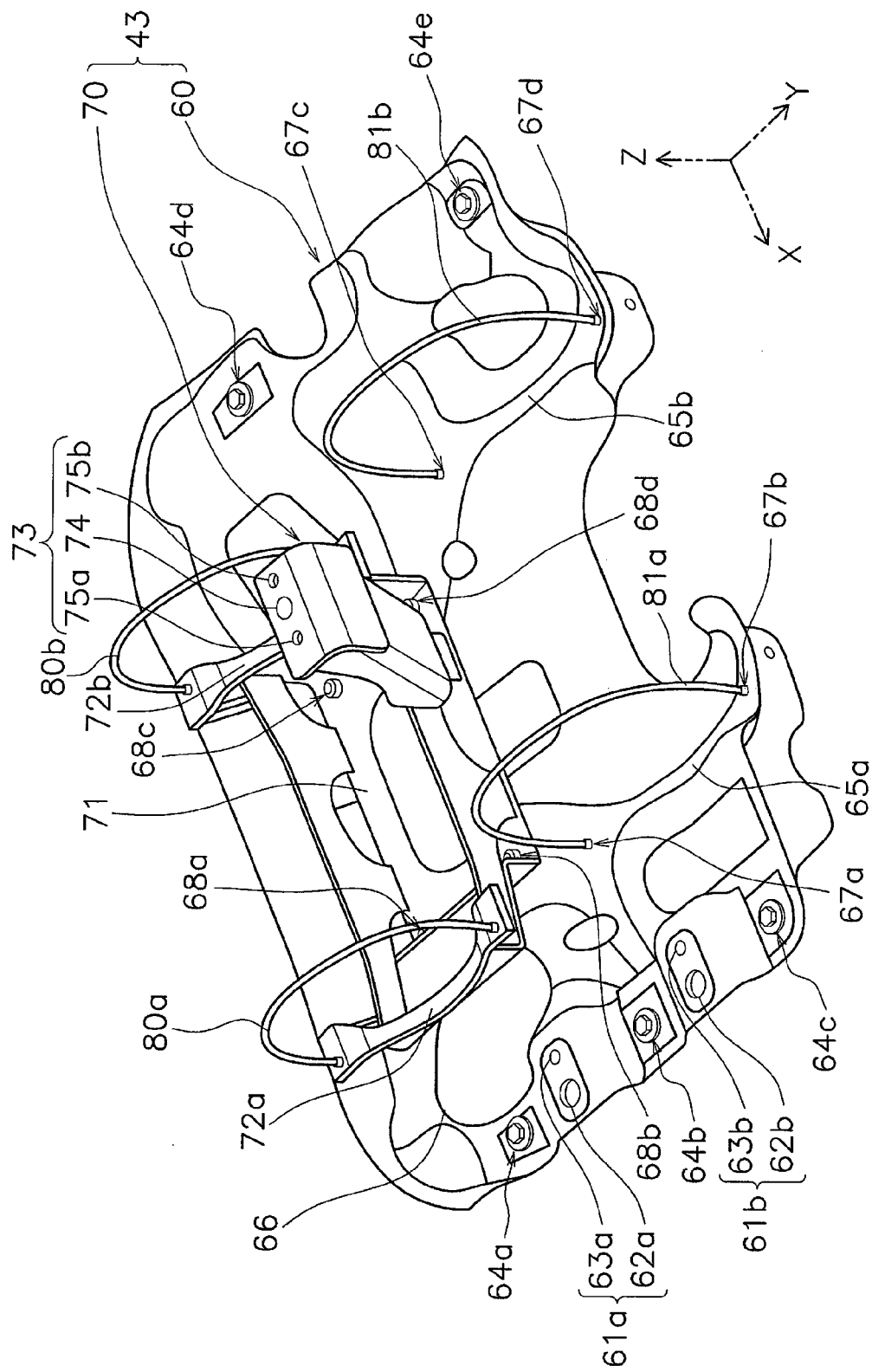
FIG. 8 is a perspective view of fixing components of the exhaust treatment device.

The bracket 43 supports the first exhaust treatment device 41 and the second exhaust treatment device 42. In other words, the bracket 43 supports the exhaust treatment device. FIG. 8 is a perspective view of fixing components for fixing the first exhaust treatment device 41 and the second exhaust treatment device 42. As illustrated in FIG. 8, the fixing components include the bracket 43, first grabbing components 80a and 80b, and second grabbing components 81a and 81b. The bracket 43 includes the base bracket 60 and a sub-bracket 70. The sub-bracket 70 includes a bottom portion 71, first support portions 72a and 72b, and a first attachment portion 73. The base bracket 60 includes second attachment portions 61a and 61b, third attachment portions 64a, 64b, 64c, 64d, and 64e, second support portions 65a and 65b, an insertion hole 66, fourth attachment portions 67a, 67b, 67c, and 67d, and fifth attachment portions 68a, 68b, 68c, and 68d. It should be noted that the first attachment portion 73 and the second attachment portions 61a and 61b are collectively simply referred to as the attachment portions in the present exemplary embodiment.

The sub-bracket 70 is a member provided separately from the base bracket 60 and is attached to the base bracket 60. In other words, the base bracket 60 supports the sub-bracket 70. The bottom portion 71 contacts a part (in particular, peripheral portions of the fifth attachment portions 68a to 68d) of the base bracket 60. The bottom portion 71 is perforated to form holes corresponding to the fifth attachment portions 68a to 68d which will be described later.

First support portions 72a and 72b are positioned above the bottom portion 71. The first support portions 72a and 72b support the first exhaust treatment device 41. In other words, the sub-bracket 70 supports the first exhaust treatment device 41. The first exhaust treatment device 41 has a roughly cylindrical contour, while the first support portions 72a and 72b include contact surfaces fitted to the outer peripheral surface of the first exhaust treatment device 41. In more detail, the first support portions 72a and 72b include contact surfaces formed in a convex shape bulged downwards.

First grabbing components 80a and 80b are mounted around the first exhaust treatment device 41 supported by the first support portions 72a and 72b (which will be described in detail hereinafter) of the sub-bracket 70. The first exhaust treatment device 41 is fixed on the sub-bracket 70 by the first grabbing components 80a and 80b and the first support portions 72a and 72b.

The first attachment portion 73 is used together with the second attachment portions 61a and 61b in order to attach/detach the exhaust treatment unit 24 to/from the vehicle. Furthermore, while a hook of a hoisting tool is not attached to the first attachment portion 73, other components of the work vehicle 100 may be attached to the first attachment portion 73.

As illustrated in FIGS. 6 and 8, the first attachment portion 73 is provided with a member extending upward from the sub-bracket 70. In other words, the first attachment portion 73 is provided with a member extending upward from the bracket 43. As a result, as illustrated in FIG. 6, the first attachment portion 73 is provided at a higher position than both of the center axis Ax1 of the first exhaust treatment device 41 and the center axis Ax2 of the second exhaust treatment device 41.

The first attachment portion 73 includes a first hole portion 74 and second hole portions 75a and 75b. A hoisting hook (for example, a hook of a crane or the like) can be attached to the first hole portion 74. In other words, the first hole portion 74 is perforated to form a hole corresponding to the size of the hoisting hook. Coupling components (for example, bolts, screws, or the like) for coupling other components of the work vehicle 100 with the first attachment portion 73 can be inserted through the second hole portions 75a and 75b. In other words, holes corresponding to the sizes of the coupling components are formed in the second hole portions 75a and 75b. Accordingly, it is possible for the detachable components to be attached to and detached from the first attachment portion 73. If the coupling component is a screw, screw grooves may be provided in the second hole portions 75a and 75b. In general, the hoisting hook is larger than the coupling component, therefore the first hole portion 74 is larger than the second hole portions 75a and 75b. It should be noted that, as illustrated in FIG. 4, the first attachment portion 73 is provided at a position such that a hoisting tool (a hoisting hook and a wire connecting the hoisting hook, the same applies hereinafter) attached to the first hole portion 74 at the position does not interfere with the second connection pipe 52 connecting the first exhaust treatment device 41 and the second exhaust treatment device 42. In more detail, the first attachment portion 73 is provided outside a space which is under the second connection pipe 52. That is, the first attachment portion 73 is provided between the first exhaust treatment device 41 and the second exhaust treatment device 42.

The base bracket 60 is formed by means of stamping of a single member. The base bracket 60 has a convex shape bulged downwards.

The third attachment portions 64a to 64e are attached to the vehicle body frame 27 of the work vehicle 100. In more detail, as illustrated in FIGS. 4 and 7, the third attachment portions 64a, 64b and 64c are attached to the first beam member 36, whereas the third attachment portions 64d and 64e are attached to the second beam member 37. The third attachment portions 64a to 64e are positioned on the same plane. As illustrated in FIGS. 4, 6 and 7, in the present exemplary embodiment, the base bracket 60 is attached to the beam members 36 and 37 with use of bolts and the like. Accordingly, the third attachment portions 64a to 64e include holes. However, when another fixing means such as a latch is employed, the third attachment portions 64a to 64e may be formed in another shape or may include members such as hooks.

The bracket 43 is fixed to the vehicle body frame 27 by the third attachment portions 64a to 64e. In other words, the exhaust treatment unit 24 is fixed to the vehicle body frame 27. The third attachment portions 64a to 64e are detachably attached to the beam members 36 and 37. In other words, the exhaust treatment unit 24 is detachably attached to the vehicle body frame 27.

The second support portions 65a and 65b support the second exhaust treatment device 42. Accordingly, the base bracket 60 supports the second exhaust treatment device 42. The second exhaust treatment device 42 has a roughly cylindrical contour, while the second support portions 65a and 65b include contact surfaces fitted to the outer peripheral surface of the second exhaust treatment device 42. In more detail, the second support portions 65a and 65b include contact surfaces formed in a convex shape bulged downwards.

The second grabbing components 81a and 81b are mounted around the second exhaust treatment device 42 supported by the second support portions 65a and 65b. The second exhaust treatment device 42 is fixed on the base bracket 60 by the second grabbing components 81a and 81b and the second support portions 65a and 65b. Since the second support portions 65a and 65b are positioned below the first support portions 72a and 72b, the center axis Ax1 of the first exhaust treatment device 41 is above the center axis Ax2 of the second exhaust treatment device 42 as illustrated in FIG. 6.

The fourth attachment portions 67a to 67d include holes through which the second grabbing components 81a and 81b for grabbing the second exhaust treatment device 42 are inserted. Each of the second grabbing components 81a and 81b includes screw grooves on both sides thereof. As illustrated in FIGS. 6 and 7, the second grabbing components 81a and 81b are fixed by means of nuts, to the fourth attachment portions 67a to 67d on the bottom surface of the base bracket 60, i.e., on the opposite side of where the second exhaust treatment device 42 is supported.

The second attachment portions 61a and 61b are used together with the first attachment portion 73 in order to attach/detach the exhaust treatment unit 24 to/from the vehicle. Furthermore, while the hook of the hoisting tool is not attached to the first attachment portion 73 and/or the second attachment portions 61a and 61b, other components of the work vehicle 100 may be attached to the first attachment portion 73 and/or the second attachment portions 61a and 61b.

The second attachment portion 61a includes a first hole portion 62a and a second hole portion 63a. The second attachment portion 61b includes a first hole portion 62b and a second hole portion 63b. A hoisting hook (for example, a hook of a crane or the like) can be attached to the first hole portions 62a and 62b. In other words, the first hole portions 62a and 62b are perforated to form holes corresponding to the size of the hoisting hook. Coupling components (for example, bolts, screws, or the like) for coupling other components of the work vehicle 100 with the second attachment portions 61a and 61b can be inserted through the second hole portions 63a and 63b. In other words, holes corresponding to the sizes of the coupling components are formed in the second hole portions 63a and 63b. Accordingly, it is possible for the detachable components to be attached and detached to and from the second attachment portions 61a and 61b. If the coupling component is a screw, screw grooves may be provided in the second hole portions 63a and 63b. In general, the hoisting hook is larger than the coupling component, therefore the first hole portions 62a and 62b are larger than the second hole portions 63a and 63b. Further, as illustrated in FIG. 6, for facilitating attachment/detachment of the hook of the hoisting tool, the second attachment portions 61a and 61b are positioned above the third attachment portions 64a, 64b, and 64c. It should be noted that, as illustrated in FIGS. 4 and 6, the second attachment portions 61a and 61b are provided at a position such that the hoisting tools attached to the first hole portions 62a and 62b at the position don't interfere with the second connection pipe 52 connecting the first exhaust treatment device 41 and the second exhaust treatment device 42.

Figure 9:
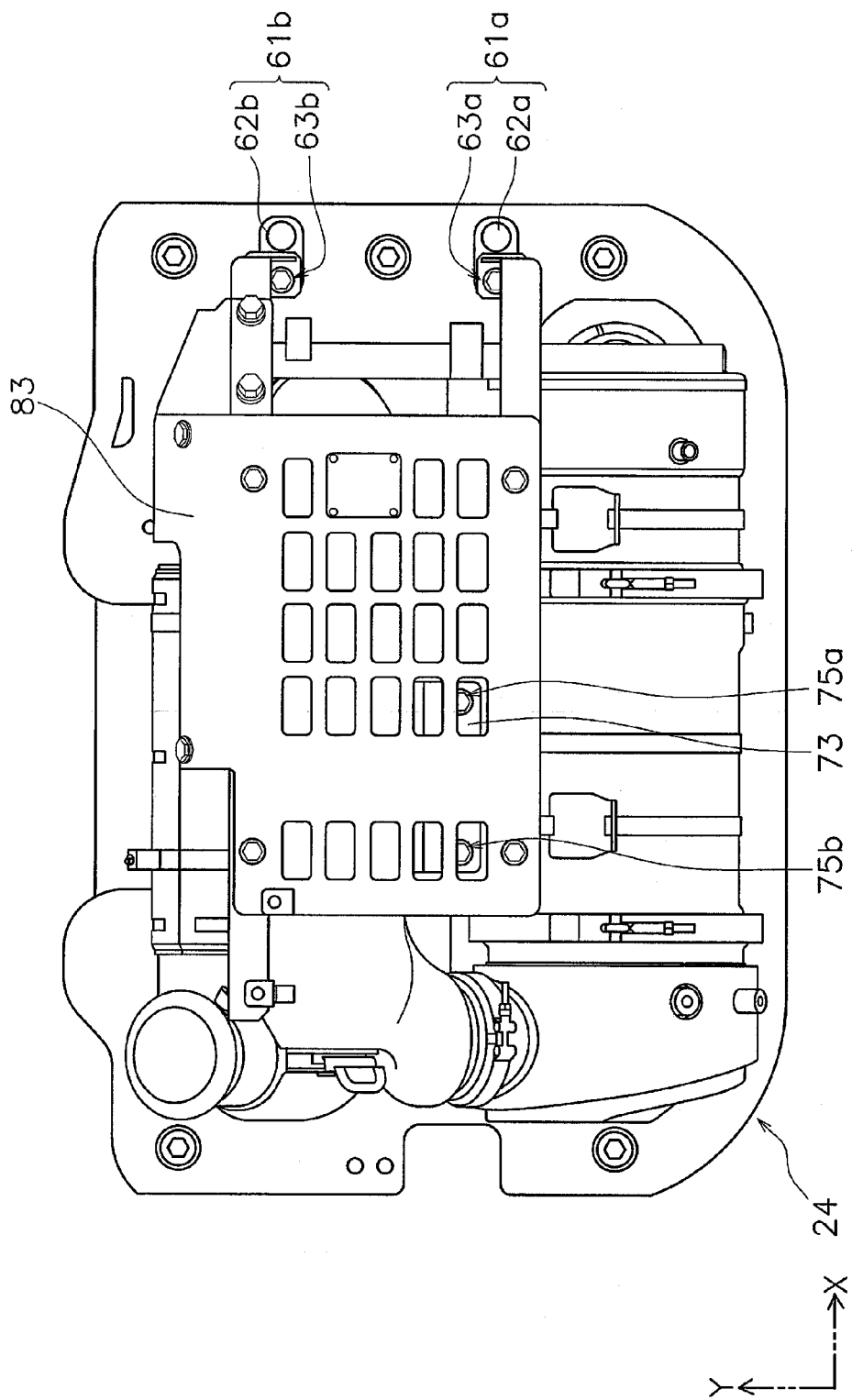
FIG. 9 is a diagram of the exhaust treatment unit to which a thermal guard is attached as seen from above.
Figure 10:
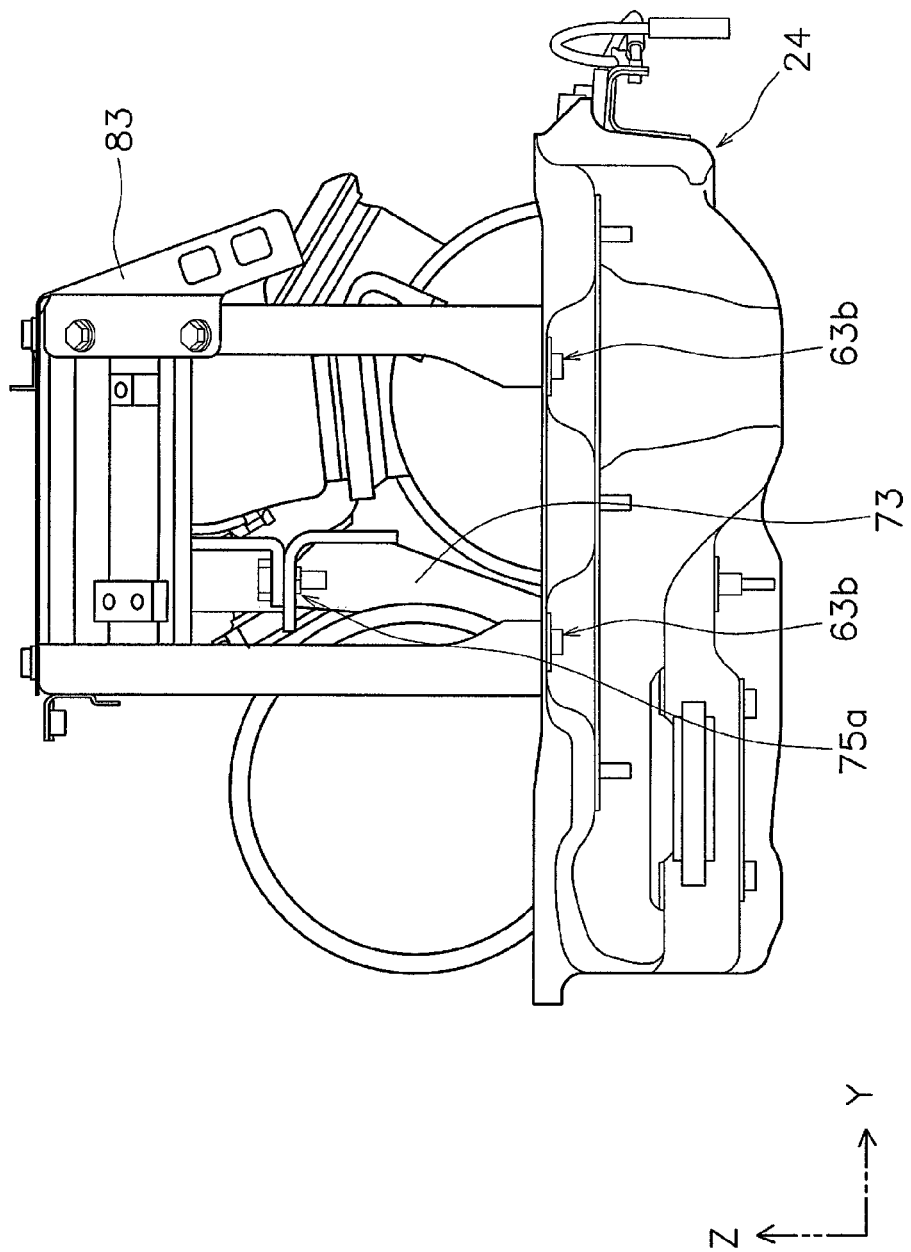
FIG. 10 is a diagram of the exhaust treatment unit to which the thermal guard is attached seen from front.

FIGS. 9 and 10 illustrate an example where the cover 83 is attached to the first attachment portion 73 and the second attachment portions 61a and 61b. The cover 83 is a protective cover covering at least a portion of the exhaust treatment unit. FIG. 9 is a diagram of the exhaust treatment unit 24 to which the cover 83 is attached as seen from above. FIG. 10 is a diagram of the exhaust treatment unit 24 to which the cover 83 is attached as seen from the front.

As illustrated in FIGS. 9 and 10, bolts are inserted through the second hole portions 75a and 75b of the first attachment portion 73. A nut is fastened to a lower part of the bolt and the cover 83 is attached to the first attachment portion 73 by the nut and bolt. Screw grooves are provided in the second hole portions 63a and 63b of the second attachment portions 61a and 61b. Then, bolts are tightened through the second hole portions 63a and 63b of the second attachment portions 61a and 61b. In this manner, the cover 83 is attached to the second attachment portions 61a and 61b. It should be noted that the fixing method using the second hole portions 75a and 75b and the second hole portions 63a and 63b illustrated in FIGS. 9 and 10 is just an example. If another fixing means such as latches is employed, the second hole portions 75a and 75b and the second hole portions 63a and 63b may be formed in another shape or may include members such as hooks.

Figure 11:
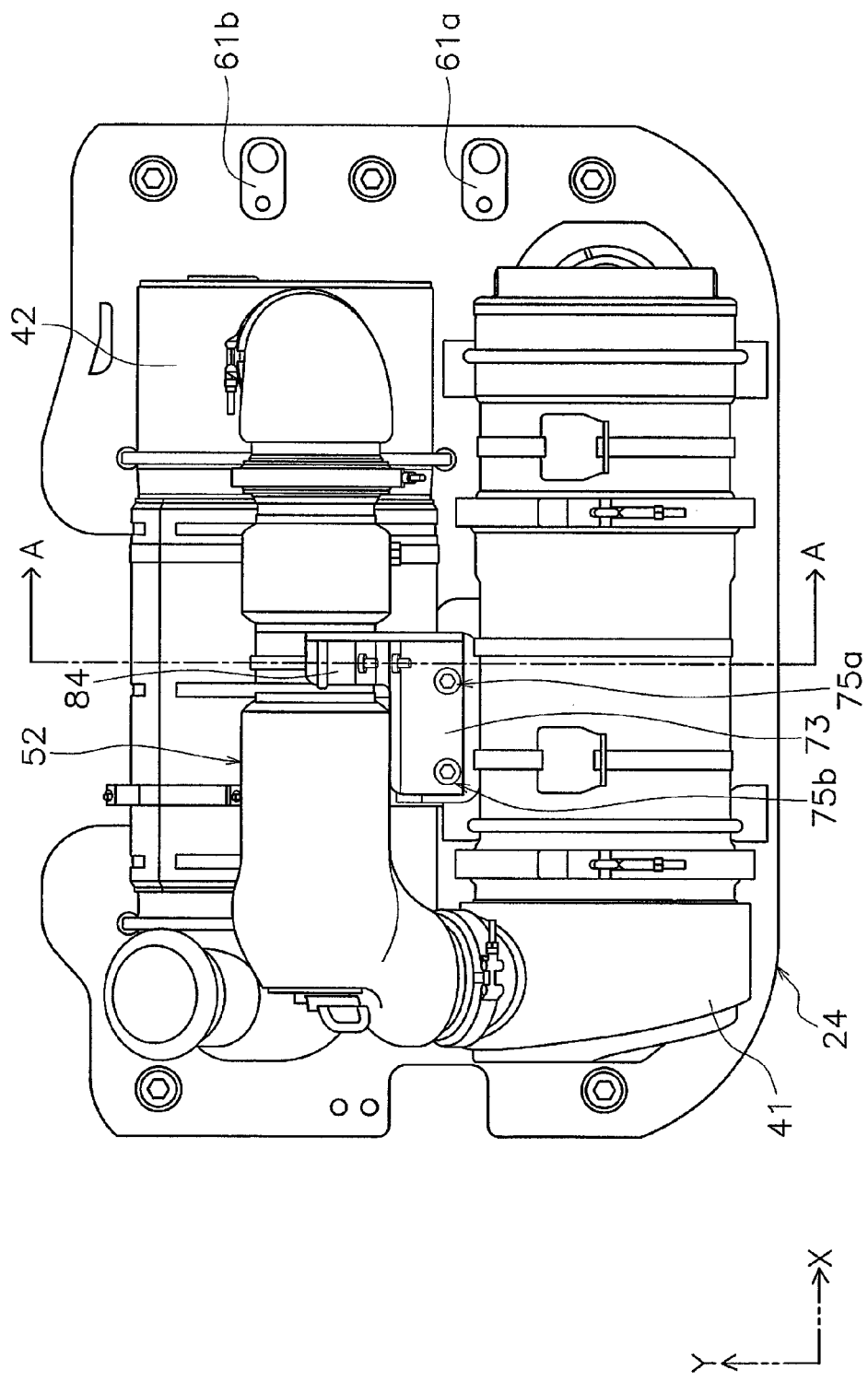
FIG. 11 is a diagram of the exhaust treatment unit to which a support component of a second connection pipe is attached as seen from above.
Figure 12:
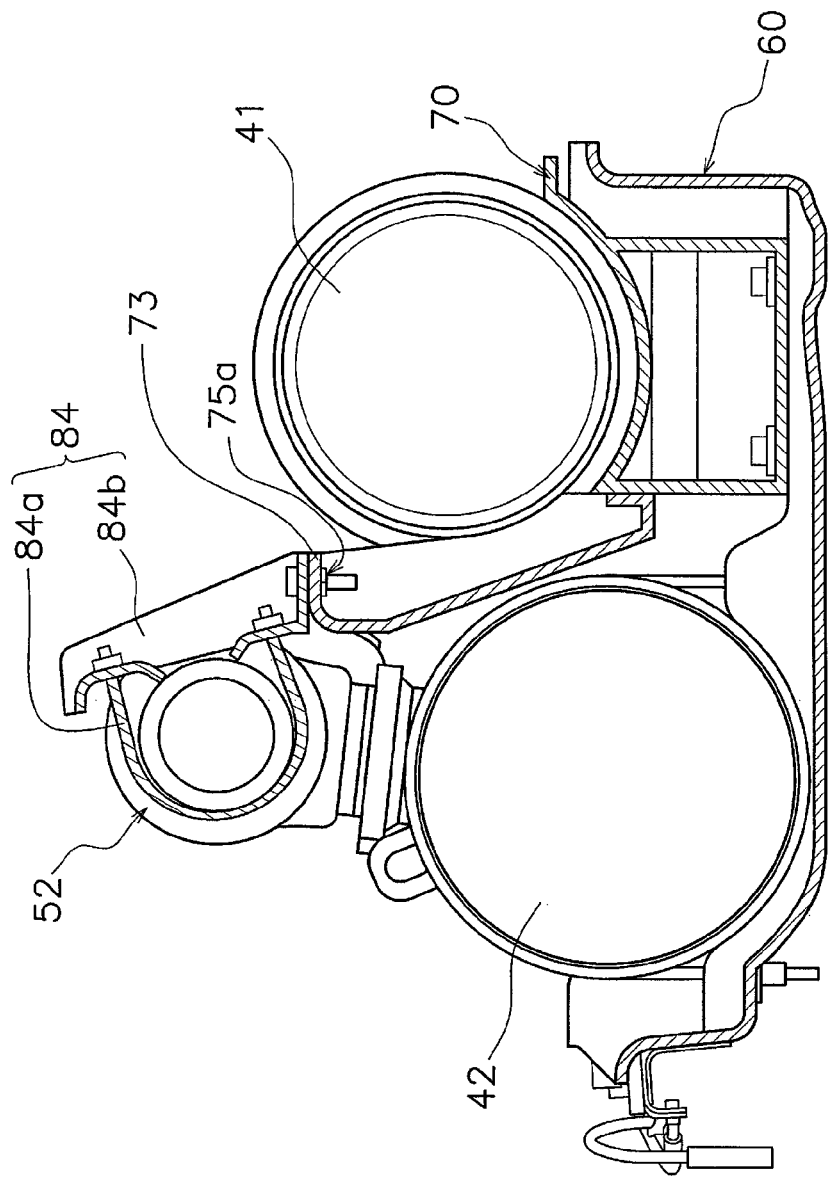
FIG. 12 is a diagram of the exhaust treatment unit seen in a direction of a cross-sectional line A-A in FIG. 11.

FIGS. 11 and 12 illustrate an example where a support component 84 of the second connection pipe 52 is attached to the first attachment portion 73 and the second attachment portions 61a and 61b. As illustrated in FIG. 12, the support component 84 includes a grabbing section 84a and a main body portion 84b. Then, the support component 84 supports the second connection pipe 52 by interposing the second connection pipe 52 between the grabbing section 84a and the main body portion 84b. FIG. 11 is a diagram of the exhaust treatment unit 24 to which the support component 84 is attached as seen from above. FIG. 12 is a diagram of the exhaust treatment unit 24 seen in a direction of a cross-sectional line A-A in FIG. 11.

As illustrated in FIGS. 11 and 12, bolts are inserted through the second hole portions 75a and 75b of the first attachment portion 73. A nut is fastened to a lower part of the bolt and the support component 84 is attached to the first attachment portion 73 by the nut and bolt. However, nothing is attached to the second attachment portions 61a and 61b. The second attachment portions 61a and 61b to which other components of the work vehicle 100 are not attached as described above may not include the second hole portions 63a and 63b.

As illustrated in FIG. 8, the fifth attachment portions 68a to 68d include holes through which bolts for fixing the sub-bracket 70 to the base bracket 60 are inserted. As illustrated in FIGS. 6 to 8, the sub-bracket 70 and the base bracket 60 are fixed using nuts and bolts. In other words, the sub-bracket 70 is detachably attached to the base bracket 60. Therefore, only the first exhaust treatment device 41 can be detached from the vehicle by detaching the sub-bracket 70 from the base bracket 60. The method of detaching only the first exhaust treatment device 41 from the vehicle will be described later. It should be noted that, if the fifth attachment portions 68a to 68d employ another fixing means such as a latch, the fifth attachment portions 68a to 68d may be formed in another shape or may include members such as hooks.

As illustrated in FIGS. 6 and 7, the first connection port 44 are inserted through the insertion hole 66. As illustrated in FIG. 6, the lowermost part of the first connection port 44 is positioned above the bottom surface of the base bracket 60. Accordingly, the first connection port 44 does not contact the ground even when the exhaust treatment unit 24 is detached from the work vehicle 100 and is placed on the ground. Furthermore, although not illustrated, the lowermost part of the first connection port 44 is positioned above the bottom portion 71. Accordingly, the first connection port 44 does not contact the ground even when the sub-bracket 70 supporting the first exhaust treatment device 41 is detached from the base bracket 60 and is placed on the ground.

Method of Attaching Exhaust Treatment Unit

Figure 13:
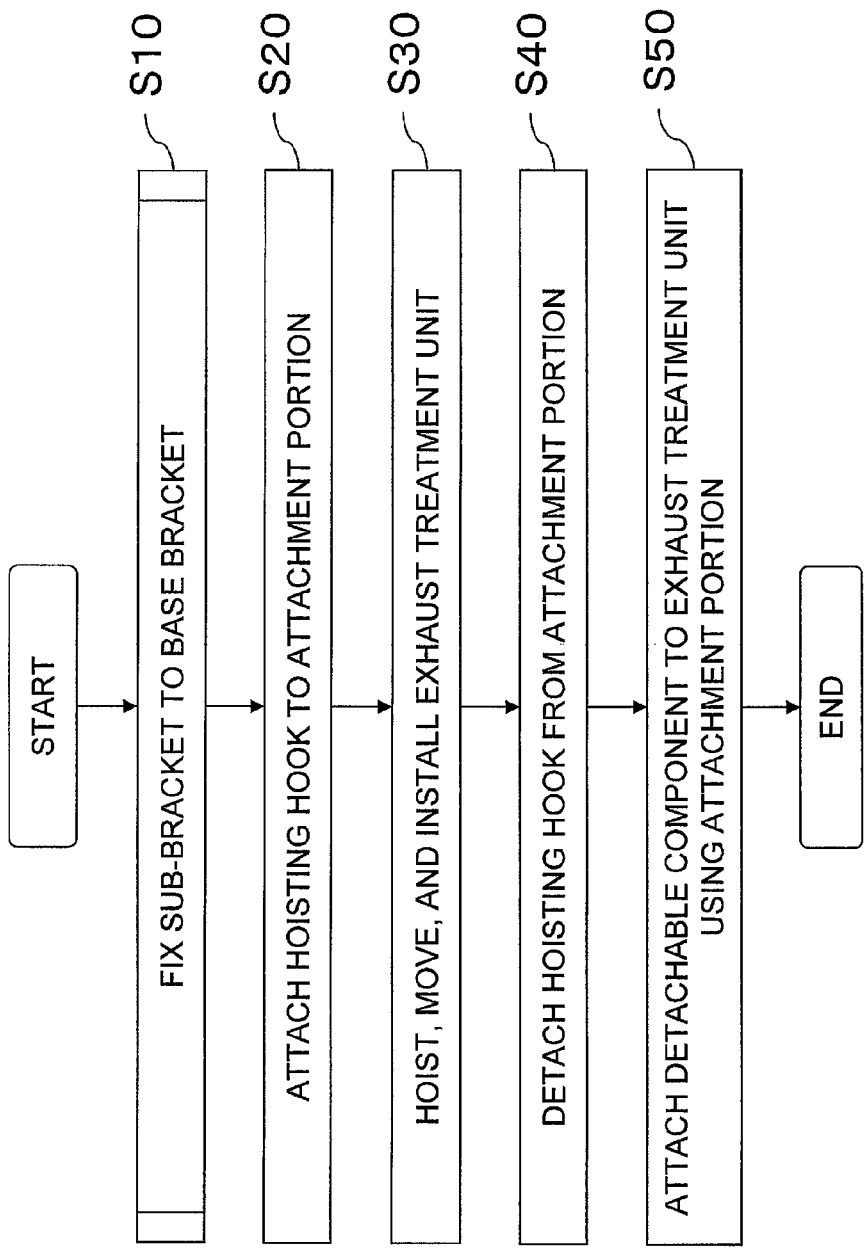
FIG. 13 is a flow chart illustrating a method of attaching the exhaust treatment unit.
Figure 14:
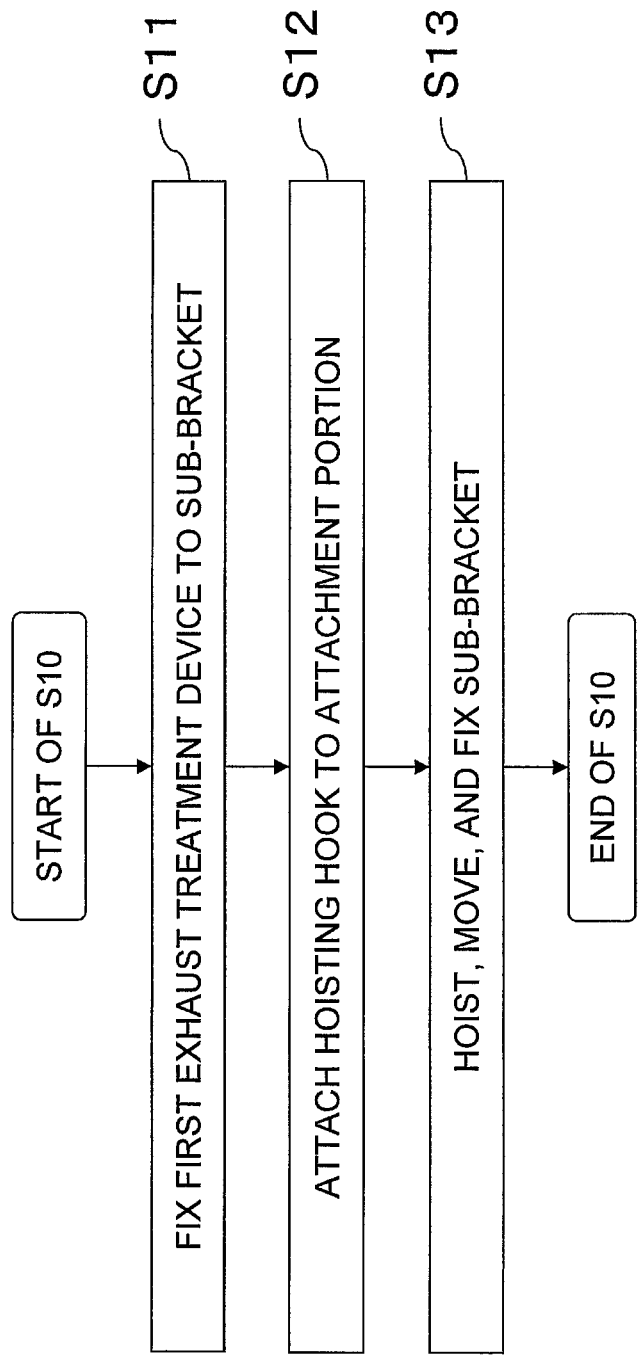
FIG. 14 is a flowchart illustrating a method of fixing the sub-bracket to the base bracket.

Next, the method of attaching the exhaust treatment unit 24 according to the present exemplary embodiment will be described. FIG. 13 is a flow chart illustrating a method of attaching the exhaust treatment unit 24. First, in step S10, the sub-bracket 70 is fixed to the base bracket 60. FIG. 14 is a flowchart illustrating the detailed method of step S10.

In step S11, the first exhaust treatment device 41 is fixed to the sub-bracket 70. Specifically, the first exhaust treatment device 41 is mounted on the first support portions 72a and 72b and the first exhaust treatment device 41 is fixed to the sub-bracket 70 by the first grabbing components 80a and 80b and the first support portions 72a and 72b.

In step S12, hoisting hooks are attached to the first attachment portion 73 and/or the sixth attachment portions 41a and 41b. The hoisting hooks may be attached to all of the first attachment portion 73 and the sixth attachment portions 41a and 41b or may be attached to some of the first attachment portion 73 and the sixth attachment portions 41a and 41b. When the hoisting hook is attached to the first attachment portion 73, the hoisting hook is attached specifically to the first hole portion 74.

In step S13, the sub-bracket 70 supporting the first exhaust treatment device 41 is hoisted by a crane or the like and moved up to the attachment position of the sub-bracket 70 in the base bracket 60. Then, the sub-bracket 70 supporting the first exhaust treatment device 41 is fixed to the base bracket 60. Specifically, the sub-bracket 70 is fixed to the base bracket 60 using the fifth attachment portions 68a to 68d.

Next, after fixing the sub-bracket 70 to the base bracket 60, the hoisting hooks are attached to the first attachment portion 73 and/or second attachment portions 61a and 61b in step S20 of FIG. 13. The hoisting hooks may be attached to all of the first attachment portion 73 and the second attachment portions 61a and 61b or may be attached to some of the first attachment portion 73 and the second attachment portions 61a and 61b. When the hoisting hook is attached to the first attachment portion 73, the hoisting hook is attached specifically to the first hole portion 74. When the hoisting hooks are attached to the second attachment portions 61a and 61b, the hoisting hooks are attached specifically to the first hole portions 62a and 62b. It should be noted that step S20 is executed in a state where other detachable components (for example, the cover 83 and the like) of the work vehicle 100 are not attached to the first attachment portion 73 and the second attachment portions 61a and 61b. Further, before step S20 is executed, the second exhaust treatment device 42 may be fixed to the base bracket 60 in advance. It should be noted that the fixing of the second exhaust treatment device 42 in advance to the base bracket 60 may be before or after step S10.

In step S30, the exhaust treatment unit 24 (specifically, the base bracket 60 supporting the first exhaust treatment device 41, the second exhaust treatment device 42, and the sub-bracket 70) is hoisted by a crane or the like and moved up to the attachment position of the vehicle body frame 27. Then, the exhaust treatment unit 24 is installed in the vehicle body frame 27. Specifically, the exhaust treatment unit 24 is fixed to the beam members 36 and 37 using the third attachment portions 64a to 64e.

In step S40, the hoisting hooks are detached from the first attachment portion 73 and/or the second attachment portions 61a and 61b. Specifically, the hoisting hooks attached in step S20 are detached from the first attachment portion 73 and/or the second attachment portions 61a and 61b. It should be noted that, between step S40 and step S50 which will be described later, the first connection pipe 51 may be attached to the first connection port 44 and the second connection pipe 52 may be attached to the second connection port 45 and the third connection port 46.

In step S50, other detachable components of the work vehicle 100 are attached to the exhaust treatment unit 24 using the first attachment portion 73 and/or second attachment portions 61a and 61b. If the detachable component is the cover 83, the cover 83 is attached to the first attachment portion 73 using the second hole portions 75a and 75b. Then, the cover 83 is attached to the second attachment portions 61a and 61b using the second hole portions 63a and 63b. Further, if the detachable component is the support component 84 of the second connection pipe 52, the support component 84 is attached to the first attachment portion 73 using the second hole portion 75a and 75b.

The method of attaching the exhaust treatment unit 24 described above is an attaching method when both of the first exhaust treatment device 41 and the second exhaust treatment device 42 are replaced. Accordingly, when only the second exhaust treatment device 42 is replaced, step S10 may be omitted. Further, when only the first exhaust treatment device 41 is replaced, only steps S11 to S13 may be executed in a state where the base bracket 60 is fixed to the vehicle body frame 27. When the first exhaust treatment device 41 is replaced with the sub-bracket 70 still fixed to the base bracket 60, only step S11 may be executed.

Method of Detaching Exhaust Treatment Unit

Figure 15:
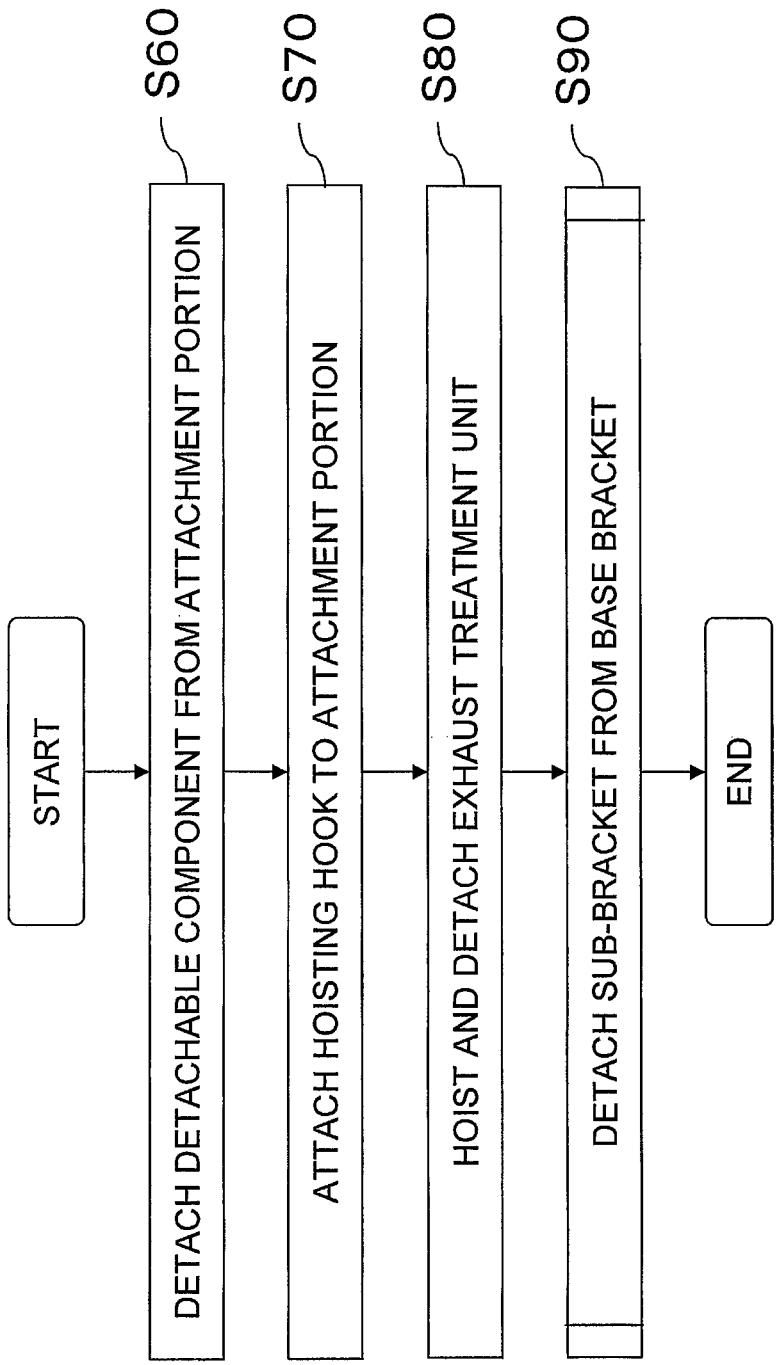
FIG. 15 is a flow chart illustrating a method of detaching the exhaust treatment unit.

Next, the method of detaching the exhaust treatment unit 24 according to the present exemplary embodiment will be described. FIG. 15 is a flow chart illustrating a method of detaching the exhaust treatment unit 24. First, in step S60, the other detachable components of the work vehicle 100 are detached from the first attachment portion 73 and/or the second attachment portion 61a and 61b. If the detachable component is the cover 83, the cover 83 is detached from the first attachment portion 73 and the second attachment portions 61a and 61b. Further, if the detachable component is the support component 84 of the second connection pipe 52, the support component 84 is detached from the first attachment portion 73. It should be noted that, between step S60 and step S70 which will be described later, the first connection pipe 51 may be detached from the first connection port 44 and the second connection pipe 52 may be detached from the exhaust treatment unit 24.

In step S70, the hoisting hooks are attached to the first attachment portion 73 and/or second attachment portions 61a and 61b. The hoisting hooks may be attached to all of the first attachment portion 73 and the second attachment portions 61a and 61b or may be attached to some of the first attachment portion 73 and the second attachment portions 61a and 61b. When the hoisting hook is attached to the first attachment portion 73, the hoisting hook is attached specifically to the first hole portion 74. When the hoisting hooks are attached to the second attachment portions 61a and 61b, the hoisting hooks are attached specifically to the first hole portions 62a and 62b.

In step S80, the exhaust treatment unit 24 (specifically, the base bracket 60 supporting the first exhaust treatment device 41, the second exhaust treatment device 42 and the sub-bracket 70) is hoisted by a crane or the like and detached from the vehicle body frame 27. It should be noted that the second exhaust treatment device 42 may be detached from the base bracket 60 at any time after step S80 is executed.

Figure 16:
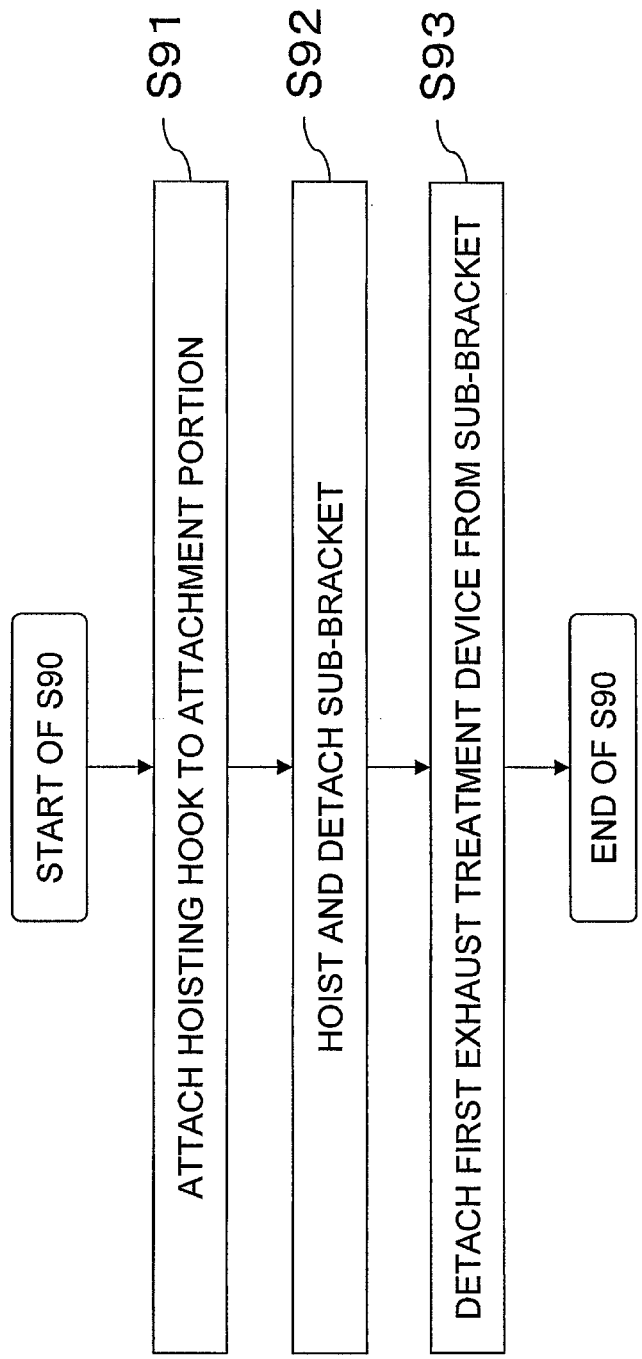
FIG. 16 is a flowchart illustrating a method of detaching the sub-bracket from the base bracket.

Finally, in step S90, the sub-bracket 70 is detached from the base bracket 60. FIG. 16 is a flowchart illustrating a detailed method of step S90.

In step S91, hoisting hooks are attached to the first attachment portion 73 and/or sixth attachment portions 41a and 41b. The hoisting hooks may be attached to all of the first attachment portion 73 and the sixth attachment portions 41a and 41b or may be attached to some of the first attachment portion 73 and the sixth attachment portions 41a and 41b. When the hoisting hook is attached to the first attachment portion 73, the hoisting hook is attached specifically to the first hole portion 74.

In step S92, the sub-bracket 70 supporting the first exhaust treatment device 41 is hoisted by a crane or the like and the sub-bracket 70 is detached from the base bracket 60.

In step S93, the first exhaust treatment device 41 is detached from the sub-bracket 70. Specifically, the first grabbing components 80a and 80b are detached from the sub-bracket 70 and then the first exhaust treatment device 41 is detached.

The method of detaching the exhaust treatment unit 24 described above is a detaching method when both of the first exhaust treatment device 41 and the second exhaust treatment device 42 are replaced. Accordingly, when only the second exhaust treatment device 42 is replaced, step S90 may be omitted. Further, when only the first exhaust treatment device 41 is replaced, only steps S91 to S93 may be executed in a state where the base bracket 60 is fixed to the vehicle body frame 27. When only the first exhaust treatment device 41 is replaced with the sub-bracket 70 still fixed to the base bracket 60, only the first exhaust treatment device 41 may be hoisted and detached after step S91.

The exhaust treatment unit 24, the method of attaching the exhaust treatment unit 24, and the method of detaching the exhaust treatment unit 24 according to the present exemplary embodiments are provided with the following features. The bracket 43 includes attachment portions 73, 61a, and 61b. The detachable components 83 and 84 which are attached to the attachment portions 73, 61a, and 61b can be attached to and detached from the attachment portions 73, 61a, and 61b. As a result, the attachment portions 73, 61a, and 61b are used in two purposes. One is that the hoisting hook is attached to the attachment portions 73, 61a, and 61b and the other is that the detachable components 83 and 84 are attached to the attachment portions 73, 61a, and 61b. Consequently, it is possible to simplify the structure of the exhaust treatment unit 24 and therefore the manufacturing costs are reduced.

Further, the attachment portion 73 is configured to have a high rigidity so that the hoisting hook can be attached to the attachment portion 73. When the attachment portion 73 is also used as the attachment portion for the detachable components 83 and 84, the attachment portion 73 can stabilize the posture of the detachable components 83 and 84 attached to the attachment portion 73.

Modifications

Above, an embodiment of the present invention has been described but the present invention is not limited to the aforementioned exemplary embodiments and various modifications are possible without departing from the scope of the present invention.

In the aforementioned embodiment, an example where the exhaust treatment unit 24 is applied to a hydraulic excavator is described, but the exhaust treatment unit 24 may be applied to another work vehicle such as a bulldozer.

The first exhaust treatment device 41 may be disposed below the beam members 36 and 37. However, it is desirable that the first exhaust treatment device 41 be disposed above the second exhaust treatment device 42.

The shapes of the first exhaust treatment device 41 and the second exhaust treatment device 42 may not be limited to cylindrical shapes or the like and may be other shapes such as an elliptical shape or a rectangular parallelepiped shape.

The first direction may not be limited to the vehicle width direction, and may be another direction. In other words, the first exhaust treatment device 41 and the second exhaust treatment device 42 may be disposed in alignment with each other in a direction different from the vehicle width direction. For example, the first direction may be the vehicle back-and-forth direction. In other words, the first exhaust treatment device 41 and the second exhaust treatment device 42 may be disposed in alignment with the vehicle back-and-forth direction.

The first exhaust treatment device 41 may be supported by any of the pillar members 31 to 35. The second exhaust treatment device 42 may be supported by any of the pillar members 31 to 35. The vehicle body frame 27, supporting the first exhaust treatment device 41 and the second exhaust treatment device 42, may not be limited to a component supporting the exterior cover 28. For example, a dedicated vehicle body frame configured to support the first exhaust treatment device 41 and second exhaust treatment device 42 may be provided.

The number of the first support portions 72a and 72b, that of the second support portions 65a and 65b, that of the first grabbing components 80a and 80b, and that of the second grabbing components 81a and 81b may not be respectively limited to two, and may be either one or three or more. In correspondence with the configuration, the number of the fourth attachment portions 67a to 67d may be changed. In the same manner, it is possible to appropriately change the numbers of the first attachment portion 73, the second attachment portions 61a and 61b, the third attachment portions 64a to 64e, and the fifth attachment portions 68a to 68d. However, it is desirable that the first attachment portion 73 and the second attachment portions 61a and 61b be provided at positions where the hoisting tools attached to the attachment portions 73, 61a and 61b do not interfere with the second connection pipe 52 connecting the first exhaust treatment device 41 and the second exhaust treatment device 42.

INDUSTRIAL APPLICABILITY

According to the present invention, it is possible to provide an exhaust treatment unit including attachment portions having holes by which the exhaust treatment unit is hung on hoisting hooks of a hoisting device and which can be used as a structure for attaching accessory components, a method for attaching the exhaust treatment unit, and a method for detaching the exhaust treatment unit.

The invention claimed is:

1. An exhaust treatment unit for treating exhaust gas from an engine of a work vehicle, the exhaust gas treatment unit comprising:
    exhaust treatment devices configured to treat exhaust gas, the exhaust treatment devices having a cylindrical shape, the exhaust treatment devices including a first exhaust treatment device and a second exhaust treatment device;
    a connection pipe connecting the first exhaust treatment device and the second exhaust treatment device;
    a bracket including an attachment portion attachable to a hoisting hook, the bracket supporting the exhaust treatment device; and a detachable component attachable to and detachable from the attachment portion, the first exhaust treatment device and the second exhaust treatment device being disposed in alignment such that longitudinal directions of the first exhaust treatment device and the second exhaust treatment device extend in an identical direction, the connection pipe being disposed above the second exhaust treatment device adjacent to the second exhaust treatment device such that a longitudinal direction of the connection pipe extends in the identical direction, an outer diameter of the connection pipe being smaller than an outer diameter of the second exhaust treatment device, the attachment portion being provided between the first exhaust treatment device and the second exhaust treatment device, the bracket including a sub-bracket supporting the first exhaust treatment device and a base bracket supporting the second exhaust treatment device and the sub-bracket, the bracket supporting the first exhaust treatment device and the second exhaust treatment device such that a center axis of the first exhaust treatment device is above a center axis of the second exhaust treatment device, and the second exhaust treatment device being fixed on the base bracket.

2. The exhaust treatment unit according to claim 1, wherein the attachment portion is provided outside a space which is under the connection pipe.

3. The exhaust treatment unit according to claim 1, wherein the attachment portion is provided at a higher position than the center axis of the first exhaust treatment device.

4. The exhaust treatment unit according to claim 1, wherein the detachable component is a cover covering at least a portion of the exhaust treatment unit.

5. The exhaust treatment unit according to claim 1, wherein the detachable component is a support component of the connection pipe connecting the first exhaust treatment device and the second exhaust treatment device.

6. The exhaust treatment unit according to claim 1, wherein the attachment portion includes
a first hole portion configured such that the hoisting hook can be inserted therethrough, and
a second hole portion configured such that a coupling component can be inserted therethrough, the coupling component being configured to couple the detachable component with the attachment portion.

7. The exhaust treatment unit according to claim 6, wherein the first hole portion is larger than the second hole portion.

8. The exhaust treatment unit according to claim 1, wherein the attachment portion includes a first attachment portion and a second attachment portion,
the sub-bracket includes the first attachment portion, and
the base bracket includes the second attachment portion.

9. The exhaust treatment unit according to claim 8, wherein at least one of the first attachment portion and the second attachment portion includes
a first hole portion configured such that the hoisting hook can be inserted therethrough, and
a second hole portion configured such that a coupling component can be inserted therethrough, the coupling component being configured to couple the detachable component with the at least one of the first and second attachment portions.

10. The exhaust treatment unit according to claim 1, wherein
the attachment portion is provided with a member extending upward from the bracket, and the attachment portion is provided at a higher position than a center axis of the exhaust treatment device.

11. The exhaust treatment unit according to claim 10, wherein
the attachment portion is provided outside a space which is under the connection pipe.

12. The exhaust treatment unit according to claim 10, wherein
the attachment portion is provided at a higher position than the center axis of the first exhaust treatment device.

13. The exhaust treatment unit according to claim 10, wherein the attachment portion includes
a first hole portion configured such that the hoisting hook can be inserted therethrough, and
a second hole portion configured such that a coupling component can be inserted therethrough, the coupling component being configured to couple the detachable component with the attachment portion.

14. The exhaust treatment unit according to claim 1, wherein
the sub-bracket is fixed on the base bracket, and a part of a bottom surface of the base bracket under the sub-bracket is as high in a vertical direction as a lowest part of the bottom surface of the base bracket under the second exhaust treatment device.

15. The exhaust treatment unit according to claim 14, wherein
the attachment portion is provided with a member extending upward from the bracket, and the attachment portion is provided at a higher position than a center axis of the exhaust treatment device.

16. The exhaust treatment unit according to claim 14, wherein
the attachment portion is provided outside a space which is under the connection pipe.

17. The exhaust treatment unit according to claim 14, wherein
the attachment portion is provided at a higher position than the center axis of the first exhaust treatment device.

18. The exhaust treatment unit according to claim 14, wherein
the attachment portion includes
a first hole portion configured such that the hoisting hook can be inserted therethrough, and
a second hole portion configured such that a coupling component can be inserted therethrough, the coupling component being configured to couple the detachable component with the attachment portion.

19. A method of attaching an exhaust treatment unit for treating exhaust gas from an engine of a work vehicle, the exhaust treatment unit including
exhaust treatment devices configured to treat exhaust gas, the exhaust treatment devices having a cylindrical shape, the exhaust treatment devices including a first exhaust treatment device and a second exhaust treatment device,
a connection pipe connecting the first exhaust treatment device and the second exhaust treatment device, and
a bracket including an attachment portion attachable to a hoisting hook, the bracket supporting the exhaust treatment device,
the method comprising:
attaching a hoisting hook to the attachment portion of the exhaust treatment unit in a state where a detachable component of the work vehicle, which can be attached to the attachment portion, is detached;

hoisting the exhaust treatment unit using a hoisting tool including the hoisting hook in a state where the detachable component is detached, the hoisting including
  moving the exhaust treatment unit up to an attachment position in the work vehicle, and
  installing the exhaust treatment unit in the work vehicle;

detaching the hoisting hook from the attachment portion; and attaching the detachable component to the exhaust treatment unit using the attachment portion, the first exhaust treatment device and the second exhaust treatment device being disposed in alignment such that longitudinal directions of the first exhaust treatment device and the second exhaust treatment device extend in an identical direction, the connection pipe being disposed above the second exhaust treatment device adjacent to the second exhaust treatment device such that a longitudinal direction of the connection pipe extends in the identical direction, an outer diameter of the connection pipe being smaller than an outer diameter of the second exhaust treatment device, the attachment portion being provided between the first exhaust treatment device and the second exhaust treatment device, the bracket including a sub-bracket supporting the first exhaust treatment device and a base bracket supporting the second exhaust treatment device and the sub-bracket, the bracket supporting the first exhaust treatment device and the second exhaust treatment device such that a center axis of the first exhaust treatment device is above a center axis of the second exhaust treatment device, and the second exhaust treatment device being fixed on the base bracket.

20. A method of detaching an exhaust treatment unit for treating exhaust gas from an engine of a work vehicle, the exhaust treatment unit including
  exhaust treatment devices configured to treat exhaust gas, the exhaust treatment devices having a cylindrical shape, the exhaust treatment devices including a first exhaust treatment device and a second exhaust treatment device,
  a connection pipe connecting the first exhaust treatment device and the second exhaust treatment device, and
  a bracket including an attachment portion attachable to a hoisting hook, the bracket supporting the exhaust treatment device, the method comprising:
  detaching a detachable component of the work vehicle, which can be attached to the attachment portion, from the attachment portion of the exhaust treatment unit;
  attaching a hoisting hook to the attachment portion in a state where the detachable component is detached; and
  hoisting the exhaust treatment unit using a hoisting tool including the hoisting hook in a state where the detachable component is detached, the hoisting including detaching the exhaust treatment unit from the work vehicle, the first exhaust treatment device and the second exhaust treatment device being disposed in alignment such that longitudinal directions of the first exhaust treatment device and the second exhaust treatment device extend in an identical direction, the connection pipe being disposed above the second exhaust treatment device adjacent to the second exhaust treatment device such that a longitudinal direction of the connection pipe extends in the identical direction, an outer diameter of the connection pipe being smaller than an outer diameter of the second exhaust treatment device, the attachment portion being provided between the first exhaust treatment device and the second exhaust treatment device, the bracket including a sub-bracket supporting the first exhaust treatment device and a base bracket supporting the second exhaust treatment device and the sub-bracket, the bracket supporting the first exhaust treatment device and the second exhaust treatment device such that a center axis of the first exhaust treatment device is above a center axis of the second exhaust treatment device, and the second exhaust treatment device being fixed on the base bracket.

* * * * *